US008844958B2

United States Patent
Omae et al.

(10) Patent No.: US 8,844,958 B2
(45) Date of Patent: Sep. 30, 2014

(54) SADDLE-RIDE TYPE VEHICLE

(71) Applicant: Honda Motor Co., Ltd, Tokyo (JP)

(72) Inventors: Akira Omae, Wako (JP); Sunao Kawano, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/847,804

(22) Filed: Mar. 20, 2013

(65) Prior Publication Data

US 2013/0257008 A1    Oct. 3, 2013

(30) Foreign Application Priority Data

Mar. 30, 2012  (JP) ................................. 2012-083197

(51) Int. Cl.
  *B62K 19/46*    (2006.01)

(52) U.S. Cl.
  CPC ..................................... *B62K 19/46* (2013.01)
  USPC ....................................................... 280/202

(58) Field of Classification Search
  CPC ........ B62K 11/00; B62K 11/02; B62K 11/04; B62K 2202/00; B62K 2204/00; B62K 2208/00; B62K 2710/04
  USPC ............ 180/219, 220; 224/413, 419; 280/202
  See application file for complete search history.

(56) References Cited

U.S. PATENT DOCUMENTS 4,163,513 A * 8/1979 Kramer ......................... 224/413

FOREIGN PATENT DOCUMENTS

JP    2006281893 A  * 10/2006
JP       4673654 B2    1/2011

* cited by examiner

*Primary Examiner* — Joseph M Rocca
*Assistant Examiner* — Felicia L Brittman
(74) *Attorney, Agent, or Firm* — Westerman, Hattori, Daniels & Adrian, LLP

(57) ABSTRACT

A saddle-ride type vehicle prevents attachment accuracy from causing influence on assembly especially in a case of attaching lid opening levers to grab rails and attaching lid opening mechanisms to a vehicle body frame side separately from the lid opening levers Each lid opening lever is pivotally attached to a grab rail through a pivot center shaft. Each lid opening mechanism is bolted to a stay on an upper pipe 9*a*. The lid opening lever is provided with an engagement portion. A curved surface portion provided on an upper end portion of a bent protrusion a projecting upward from the lid opening mechanism is inserted in the engagement portion to vertically engage the lid opening lever and the lid opening mechanism with each other. In this way, the assembly can be done without being influenced by the attachment accuracy.

13 Claims, 17 Drawing Sheets

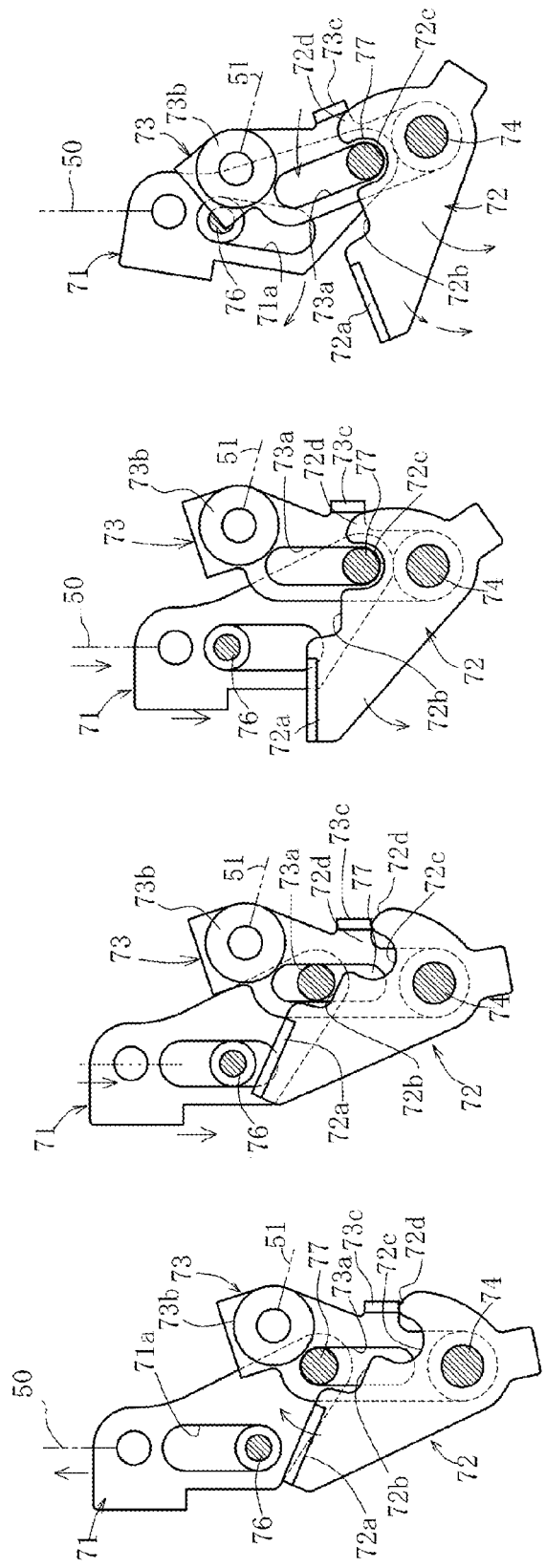

SADDLE-RIDE TYPE VEHICLE

CROSS-REFERENCE TO RELATED APPLICATIONS

The present application claims priority under 35 U.S.C. §119 to Japanese Patent Application No. 2012-083197, filed Mar. 30, 2012, the contents of which is incorporated herein, by reference, in its entirety.

TECHNICAL FIELD

This invention relates to a saddle-ride type vehicle such as a motorcycle including a grab rail and a side trunk on each lateral side of a passenger seat, and relates particularly to one in which the lid of the side trunk is opened by a remote operation and in which a lid opening lever for the remote operation is provided to the grab rail.

BACKGROUND OF THE INVENTION

The following motorcycle, which is a saddle-ride type vehicle, has been publicly known (see Japanese Patent No. 4673654). A side trunk is provided on each lateral side of a passenger seat of the motorcycle. Catches to lock the lid of the side trunk in a closed state are provided inside the side trunk. Moreover, a lid opening lever to remotely operate the catches is provided under a grab rail. Further, to make operations of the lid opening lever unfunctional, actions of lid opening mechanisms to release the locked state of the catches through a remote operation are locked. Furthermore, a key operation is performed on a key cylinder provided to the side trunk to release the locked state so as to make the operations of the lid opening lever functional.

SUMMARY OF THE INVENTION

Meanwhile, when attaching the lid opening lever to the grab rail, one needs to avoid variations in attachment accuracy, which would otherwise cause an error in the size of the gap between the lid opening lever and the grab rail and consequently impair the unity between the grab rail and the lid opening lever.

Variations in the attachment accuracy of the lid opening lever and of the lid opening mechanisms are likely to result in a large positional error of the lid opening lever relative to the grab rail, especially in a case of providing the lid opening lever to the grab rail, attaching the lid opening mechanisms to the vehicle body frame side, and making the lid opening lever and the lid opening mechanisms operable in conjunction with each other directly without any cable in between. Moreover, the error is even larger in a case of attaching the lid opening mechanisms to the vehicle body frame through a detachably fastened stay, instead of attaching them together directly.

A large positional error of the lid opening lever relative to the grab rail leads to a possibility that the lid opening lever and the grab rail may interfere with each other without any gap therebetween, thus making it difficult to open the lid or that the gap may be so large that one cannot hook his or her fingers on the lever properly.

In this respect, a lid opening lever is attached to a grab rail with the smallest possible gap therebetween while taking assembly errors into consideration.

A first aspect of the saddle-ride type vehicle saddle-ride type vehicle provides a saddle-ride type vehicle comprising: a tandem seat having a rider seat and a passenger seat disposed therebehind; a side trunk disposed on a lateral side of the passenger seat; a rear-vehicle-body cover continuously covering the side trunk and a rear part of a vehicle body; and a grab rail for a passenger to grab which is provided on a lateral side near the passenger seat, wherein the side trunk includes a lid for opening and closing an opening portion through which an item is put in and out of the side trunk, a lid lock which sets the lid in a closed state, a lid opening mechanism which releases the locked state of the lid lock to open the lid, and a lid opening lever which actuates the lid opening mechanism, the grab rail is attached to a vehicle body frame, the lid opening lever is pivotally attached to a lower surface of the grab rail, the lid opening mechanism is attached to a stay and vertically engaged with the lid opening lever, the stay being detachably fastened to a vehicle body frame side, and an engagement portion of the lid opening mechanism and the lid opening lever has a gap to absorb an error.

A second aspect of the saddle-ride type vehicle is that wherein, in the first aspect, the passenger seat has, on both sides of a seating surface thereof, a seat edge portion which extends obliquely downward while spreading outward and connects to an upper surface of the rear-vehicle-body cover, and the grab rail is attached to the vehicle body frame together with the seat in such a way as to at least partly overlap the seat edge portion from above in a plan view and contact a surface thereof.

A third aspect of the saddle-ride type vehicle is that wherein, in the first or second aspect, the saddle-ride type vehicle comprises an elastic member which is engaged with the grab rail and the lid opening lever and biases the lid opening lever in such a way that a position of the lid opening lever in a free state remains constant.

A fourth aspect of the saddle-ride type vehicle is that wherein, in any one of the first to third aspects, an engagement protrusion projecting vertically and having a curved surface portion formed on a tip portion thereof is provided to any one of the lid opening mechanism and the lid opening lever, an engagement hole for the curved surface portion to be engaged with is provided to the other of the lid opening mechanism and the lid opening lever, the curved surface portion is engaged with the engagement hole with a gap therebetween, and the gap between the curved surface portion and the engagement hole has directional characteristics.

A fifth aspect of the saddle-ride type vehicle is that wherein, in any one of the second to fourth aspects, the rear-vehicle-body cover continuously covers the side trunk and the rear part of the vehicle body and extends in a vehicle width direction from the seat edge portion, a difference in level between the seat and the rear-vehicle-body cover in a height direction is small, an upper surface of the grab rail is substantially at the same height as an upper surface of the seat, and the lid opening lever not in use is situated within the grab rail in the height direction and the width direction.

A sixth aspect of the saddle-ride type vehicle is that wherein, in any one of the first to fifth aspects, the grab rail has a grabbing portion for the passenger to grab and an extension portion extending rearward from the grabbing portion, the grabbing portion is formed extending upwardly rearward while the extension portion is formed extending downwardly rearward so that the passenger is capable of properly recognizing the grabbing portion even by touch, a portion of the rear-vehicle-body cover above the side trunk has a front end situated rearward of a passenger step and forms a surface extending upwardly rearward from the front end in such a way as to approach the upper surface of the grab rail as extending rearward, in a side view, the lid opening lever is under the extension portion of the grab rail but above the surface of the rear-vehicle-body cover extending upwardly rearward, the lid opening lever has a finger hook portion on a front side and a pivot base portion on a rear side, the pivot base portion allowing insertion of a pivot center shaft, and a front end portion of the finger hook portion is higher in level than the pivot base portion.

A seventh aspect of the saddle-ride type vehicle is that wherein, in any one of the first to sixth aspects, the grab rail has a grabbing portion for the passenger to grab and an extension portion extending rearward from the grabbing portion, the grabbing portion and the extension portion are partitioned by an attachment portion of the grab rail to the vehicle body, a vertical gap between the extension portion and the vehicle body is smaller than that between the grabbing portion and the vehicle body, the lid opening lever is under the extension portion but above the rear-vehicle-body cover and operates outwardly in the vehicle width direction from a lateral side of the vehicle body to open the lid.

An eighth aspect of the saddle-ride type vehicle is that wherein, in any one of the first to seventh aspects, the saddle-ride type vehicle comprises a plurality of the lid opening levers and a plurality of the lid opening mechanisms, each of the lid opening mechanisms includes a lock mechanism for making a lid opening action thereof unfunctional, the lock mechanism is released from a locked state by means of a key cylinder, the key cylinder is provided as a single member, is attached with only a key hole shown on an exterior surface of the vehicle body, and permits only a specific key to pivot a key cylinder lever to perform an unlocking action, the saddle-ride type vehicle comprises a transmission portion with a plurality of passages to transmit the unlocking action of the key-cylinder lever from the key cylinder to the plurality of lid opening mechanisms, and the plurality of lid opening mechanisms perform the lid opening action to open the lids in response to actuation of the lid opening levers, respectively, on condition that the transmission portion with the plurality of passages transmits the unlocking action of the key-cylinder lever to the plurality of lid opening mechanisms.

A ninth aspect of the saddle-ride type vehicle is that wherein, in any one of the first to eighth aspects, the side trunk is provided on both left and right sides of the vehicle, the lid opening lever and the lid opening mechanism are each provided as many as the number of the side trunks and are provided under left and right grab rails, respectively, each of the lid opening mechanisms includes the lock mechanism which is locked to make the lid opening action unfunctional and is released from the locked state by the key cylinder, and the key cylinder is disposed at a rear end of the vehicle.

According to the first aspect of the saddle-ride type vehicle, the lid opening lever and the lid opening mechanism, which are attached to different parts, are vertically engaged with each other in such a way as to operate in conjunction with each other. Moreover, the engagement portion is given the gap to absorb an error. Thus, the gap between the lid opening lever and the grab rail can be made as small as possible. Accordingly, unity between the lid opening lever and the grab rail can be achieved.

According to the second aspect of the saddle-ride type vehicle, the grab rail is attached to the vehicle body frame together with the seat in such a way as to at least partly overlap the seat edge portion from above in a plan view and contact the surface thereof. Thus, the grab rail is attached based on the seat which basically increases the positional error between the lid opening lever and the lid opening mechanism. Such a large error, however, can be absorbed effectively by engaging them by using the error absorbing gap.

According to the third aspect of the saddle-ride type vehicle, the saddle-ride type vehicle includes the elastic member which is engaged with the grab rail and the lid opening lever and biases the lid opening lever in such a way that the position of the lid opening lever in a free state remains constant. Thus, the engagement portion can be positioned to a predetermined initial position in the assembly. Accordingly, the assembly is made easier.

According to the fourth aspect of the saddle-ride type vehicle, the assembly error which actually occurs differs in the front-rear direction of the vehicle body, etc. and thus has directional characteristics. The gap between the curved surface portion and the engagement hole in the engagement portion is given directional characteristics. By giving directional characteristics in advance by reflecting this, it is possible to minimize a backlash in the assembly.

According to the fifth aspect of the saddle-ride type vehicle, the lid opening lever is situated within a small stepped portion given on a far side of the wide rear-vehicle-body cover as viewed from the lateral side of the vehicle. Accordingly, the possibility of accidentally operating of the lid opening lever can be reduced.

According to the sixth aspect of the saddle-ride type vehicle, a front end portion of the finger hook portion is long. Thus, it is easy to hook fingers on the finger hook portion and operate it. Accordingly, the operatability is improved. The lid opening lever has its upper side along the upper surface of the grab rail and its lower side along the surface of the rear-vehicle-body cover in a side view. Thus, the design is improved.

The portion of the rear-vehicle-body cover above the side trunk has a front end situated rearward of the passenger step and forms the surface extending upwardly rearward from the front end in such a way as to approach the upper surface of the grab rail as extending rearward. Thus, the side trunk can expand wider vertically toward the rear. Accordingly, the side trunk can increase its volume without obstructing the passenger's leg.

According to the seventh aspect of the saddle-ride type vehicle, the lid opening lever is located in an area partitioned from the grabbing portion. Accordingly, an accidental operation on the lid opening lever is less likely. Moreover, the lid opening lever pivots outward in the vehicle width direction. Thus, the action of pivoting the lid opening lever and the action of grabbing the grab rail from outside are opposite actions. Accordingly, an accidental operation on the lid opening lever is less likely to occur.

According to the eighth aspect of the saddle-ride type vehicle, each lid is opened only upon a releasing operation with the specific key. This offers security and safety that prevents unintentional opening of the lid.

Moreover, inserting one key into one key hole can release the key-locked state in multiple locations. Accordingly, the operability is improved.

According to the ninth aspect of the saddle-ride type vehicle, the key operation takes place at the rear of the vehicle body. Thus, one can perform the key operation regardless of whether he or she is standing on the left or right side of the vehicle. Accordingly, the same operability can be offered to all riders in the world regardless of the custom such as right-hand traffic and left-hand traffic.

BRIEF DESCRIPTION OF THE DRAWINGS

The advantages of the invention will become apparent in the following description taken in conjunction with the drawings, wherein:

FIGS. 17(a)-17(d) are views describing actuation of the left lid opening mechanism.

DETAILED DESCRIPTION OF THE INVENTION

Figure 1:
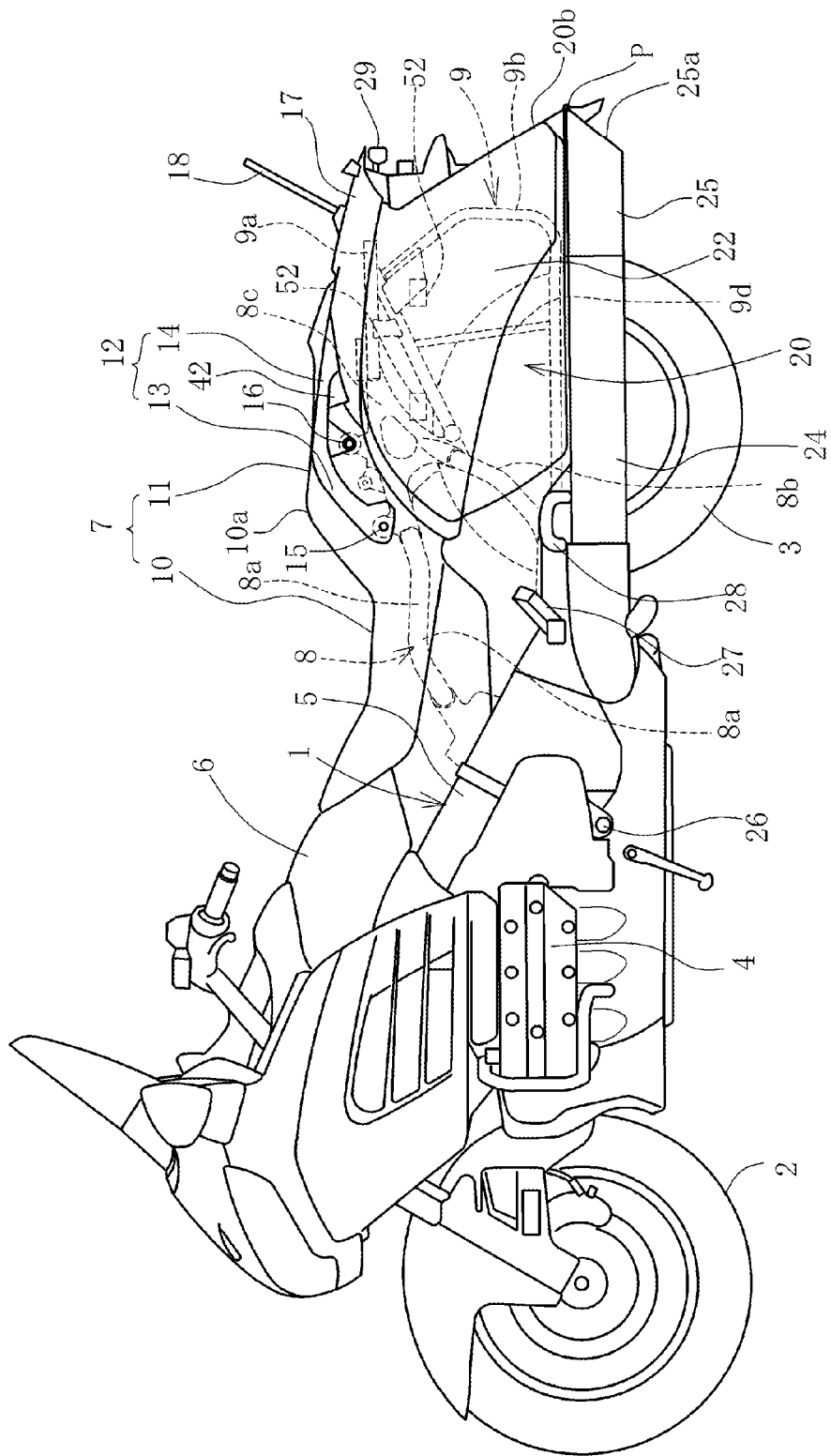
FIG. 1 is a left-side view of a vehicle according to an embodiment.

Hereinbelow, an embodiment will be described with reference to the drawings. Note that the directions to be used in the present application are based on a vehicle. Specifically, in a state shown in FIG. 1, the left side and upper side of the drawing as well as the near side in the direction perpendicular to the drawing will be referred to as the front side, upper side, and left side, respectively.

Figure 2:
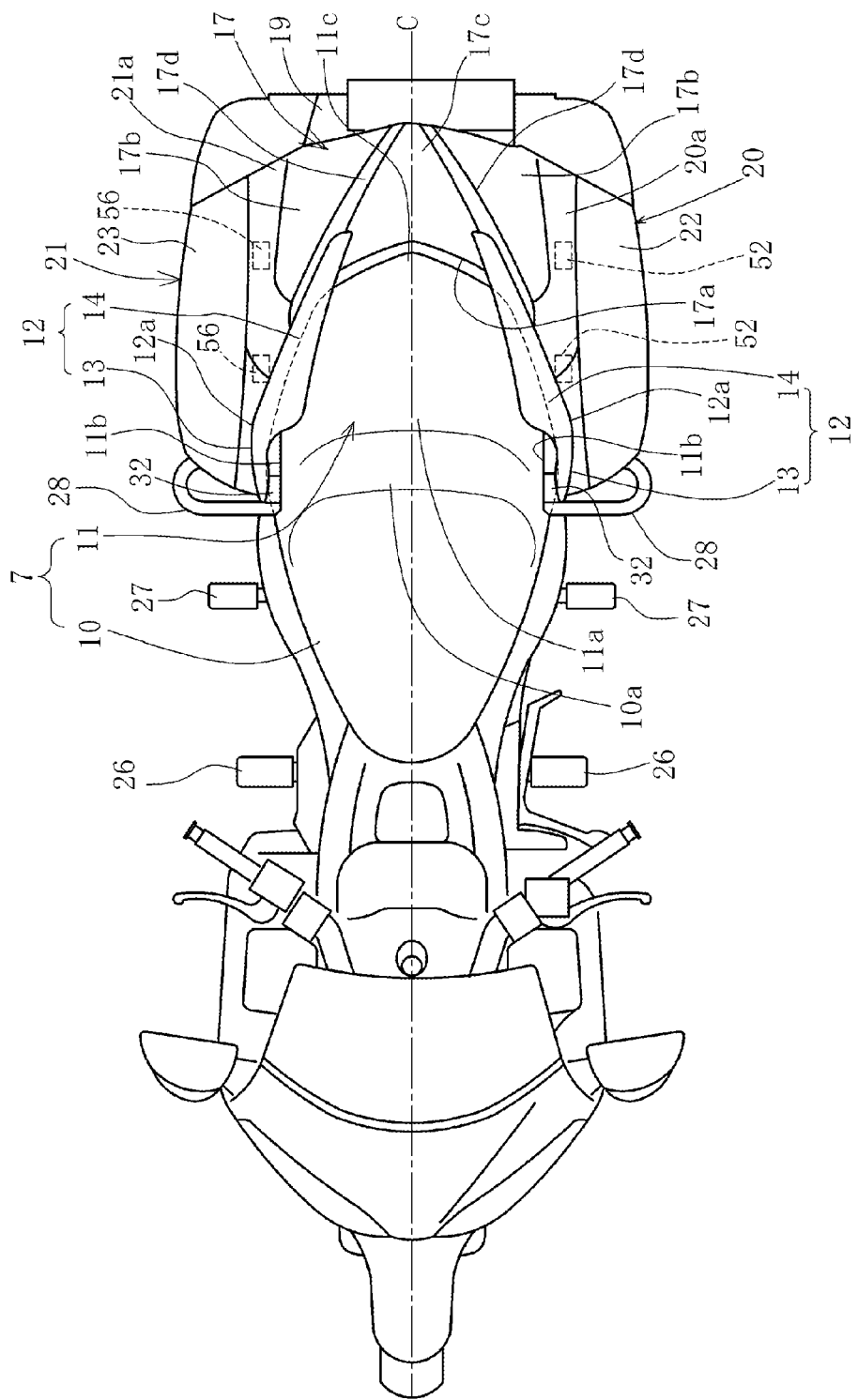
FIG. 2 is a plan view of the vehicle.

FIG. 1 is a left-side view of a large motorcycle according to this embodiment, and FIG. 2 is a plan view thereof. In these drawings, the motorcycle includes a flat engine 4 disposed on a front part of a vehicle body frame 1. A main frame 5 forming the vehicle body frame 1 supports the engine 4. A fuel tank 6 is supported on the main frame 5. Behind the fuel tank 6, a tandem seat 7 is supported on a seat rail 8. The seat rail 8 forms the vehicle body frame 1 and includes: an upper pipe 8a and a lower pipe 8b separated from each other in the front-rear direction and extending obliquely upward toward the rear from a rear portion of the main frame 5; and a joint plate 8c joining the upper pipe 8a and the lower pipe 8b at their rear end portions. The upper pipe 8a, the lower pipe 8b, and the joint plate 8c are each provided in a left and right pair.

A trunk stay 9 is provided at the rear of each seat rail 8. The trunk stay 9 includes: an upper pipe 9a extending rearward substantially horizontally from the joint plate 8c; a lower pipe 9b bending in a substantially hook shape in a side view between a rear end portion of the upper pipe 9a and a lower portion of the lower pipe 8b; a reinforcing pipe 9c diagonally coupling an upper portion of the lower pipe 8b and the rear end portion of the upper pipe 9a; and a center pipe 9d vertically connecting a rear portion of the reinforcing pipe 9c and a middle portion, in the front-rear direction, of a lower portion of the lower pipe 9b extending substantially horizontally. The upper pipe 9a, the lower pipe 9b, the reinforcing pipe 9c, and the center pipe 9d are each provided in a left and right pair.

The seat 7 is a tandem type in which a rider seat 10 and a passenger seat 11 are integrated. The passenger seat 11 is arranged at a higher position than the rider seat 10 with a backrest 10a of the rider seat 10 therebetween. There are provided grab rails 12 which extend rearward from lateral portions of the backrest 10a over the lateral sides of the passenger seat 11, respectively.

A front portion of each grab rail 12 is a grabbing portion 13 while a rear portion of the grab rail 12 is an extension portion 14 formed integrally with the grabbing portion 13 and extending rearward. The front and rear of the grabbing portion 13 are a front attachment portion 15 and a rear attachment portion 16, respectively, and are fastened to the seat rail 8 together with the seat 7. Here, the grab rail 12 is attached to the seat rail 8 together with the seat 7 in such a way as to at least partly overlap a lateral portion of the seat from above in a plan view and contact the surface thereof.

By grabbing each grab rail 12, the passenger can stabilize his or her posture during travel. Moreover, the grab rail 12 is designed such that one can grab it when, for example, pushing or pulling the vehicle body forward or rearward while off the vehicle. Thus, one may grab the grab rail 12 to support the vehicle body while parking or after parking or may use the grab rail 12 while taking out a stand or putting it back. Moreover, during travel, the passenger can realize that his or her seating position is off a center C of the vehicle body (FIG. 2) when the left or right thigh touches the left or right grab rail. Thus, the passenger can utilize the grab rails 12 to figure out the correct seating position.

The rear of the passenger seat 11 is covered with a rear center cover 17 which corresponds to a rear-vehicle-body cover of the present application. The rear center cover 17 bulges leftward and rightward beyond a rear portion of the passenger seat 11 and a rear portion of each extension portion 14 and covers an upper part of the vehicle body behind the passenger seat 11. The extension portion 14 of each grab rail 12 is disposed on the upper surface of the rear center cover 17 in such a way as to cross from the upper surface of the passenger seat 11 in a plan view (FIG. 2).

An antenna 18 is provided to a middle portion, in the front-rear direction, of a right end portion of the rear center cover 17 and extends obliquely upward toward the rear.

A left side trunk 20 and a right side trunk 21 are provided on both left and right sides of the vehicle body below the seat 7 and supported on the trunk stays 9, respectively. The left side trunk 20 and the right side trunk 21 are provided with openable-closable lids 22 and 23, respectively.

A lower end portion of the lid 22 is attached to a body portion 20a of the left side trunk (FIG. 2; 21a is the body portion of the right side trunk) through a hinge not shown, and the lid 22 opens outward from the top toward an outer lateral side. A lid lock 52 to lock the lid 22 in a closed state is provided in a front upper portion and a rear upper portion of the left side trunk 20.

Further, there is provided a trunk opener which is a mechanism to release the lid locks 52 to open the lid 22 (details will be described later).

The right side trunk 21 side has the same structure; it is provided with the same lid locks 56 (FIG. 2) and is operated through the trunk opener.

In a lower part of the vehicle body, there is a muffler 24 extending rearward from the engine 4 substantially horizontally in a side view.

The muffler 24 extends by a lateral side of a rear wheel 3 beyond the rear of the rear wheel 3. A tail pipe 25 provided at a rear end portion extends rearward while maintaining the outer diameter of the body of the muffler 24. A rear end 25a of the tail pipe 25 has an inclining shape with a cut extending obliquely upward toward the rear in a side view. At a point P, the rear end 25a meets with a rear end surface 20b of the left side trunk 20 which extends obliquely downward toward the rear in a side view. In this way, exhaust gas does not flow over a lower portion of the left side trunk 20. The muffler 24 and the tail pipe 25 are each provided in a left and right pair, sandwiching the rear wheel 3 therebetween.

Reference numeral 26 in the drawings denotes driver steps; 27, passenger steps; 28, side bumpers; and 29, a key for an operation to unlock a key cylinder provided to the later-described trunk opener.

Next, the grab rails 12 and their periphery will be described in detail.

Figure 3:
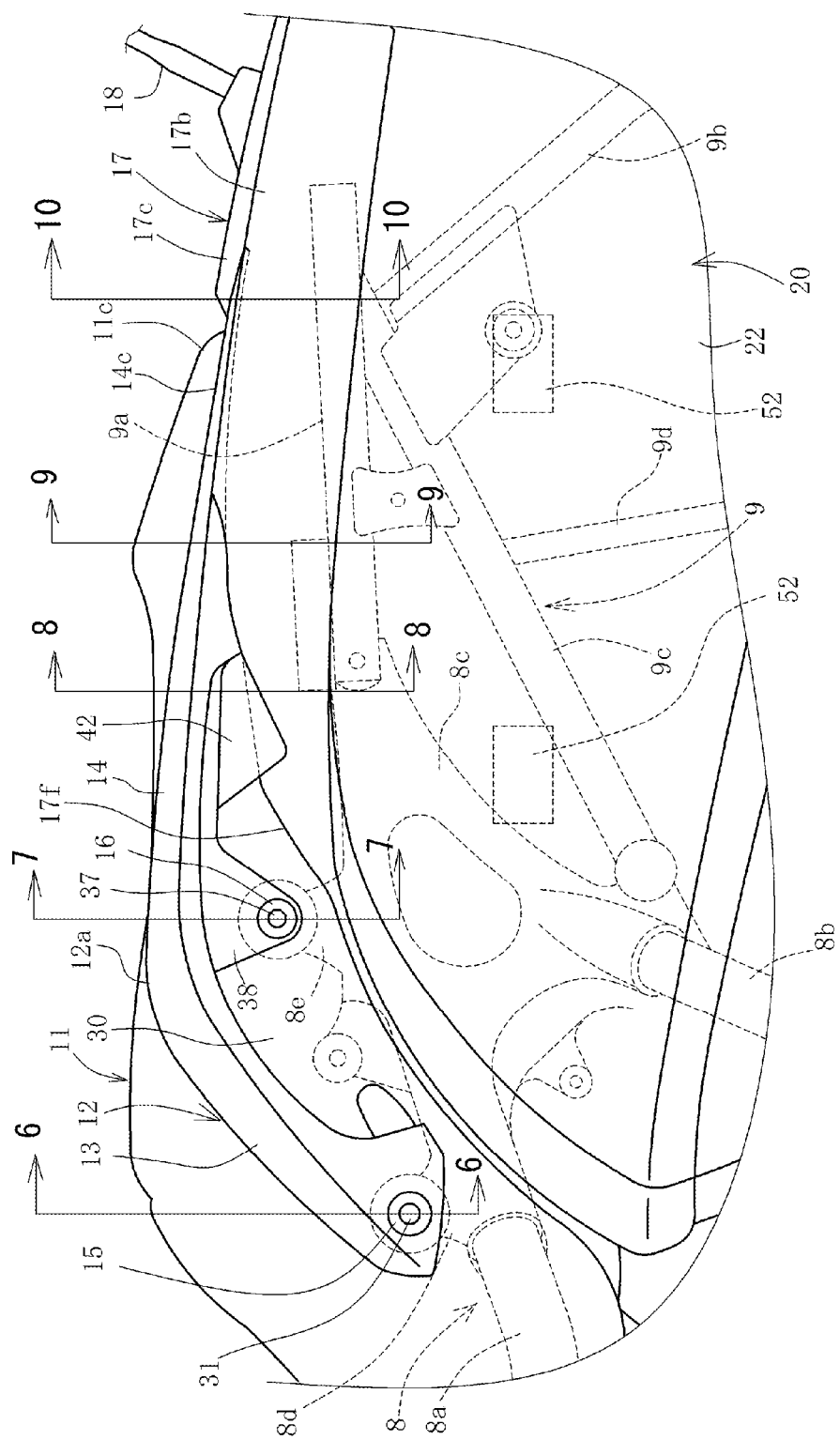
FIG. 3 is a side view of a rear part of the vehicle.
Figure 4:
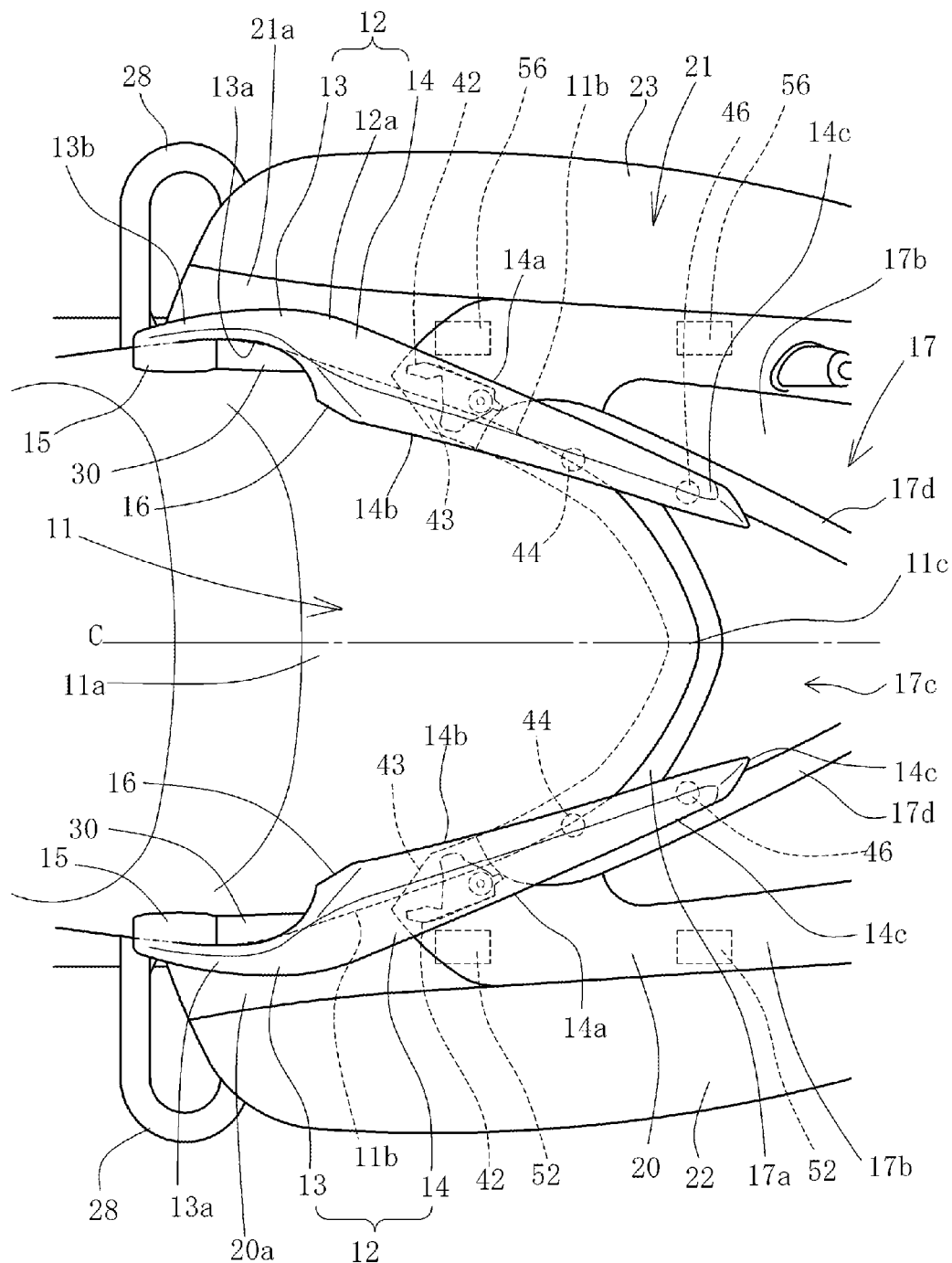
FIG. 4 is a plan view of the rear part of the vehicle.
Figure 5:
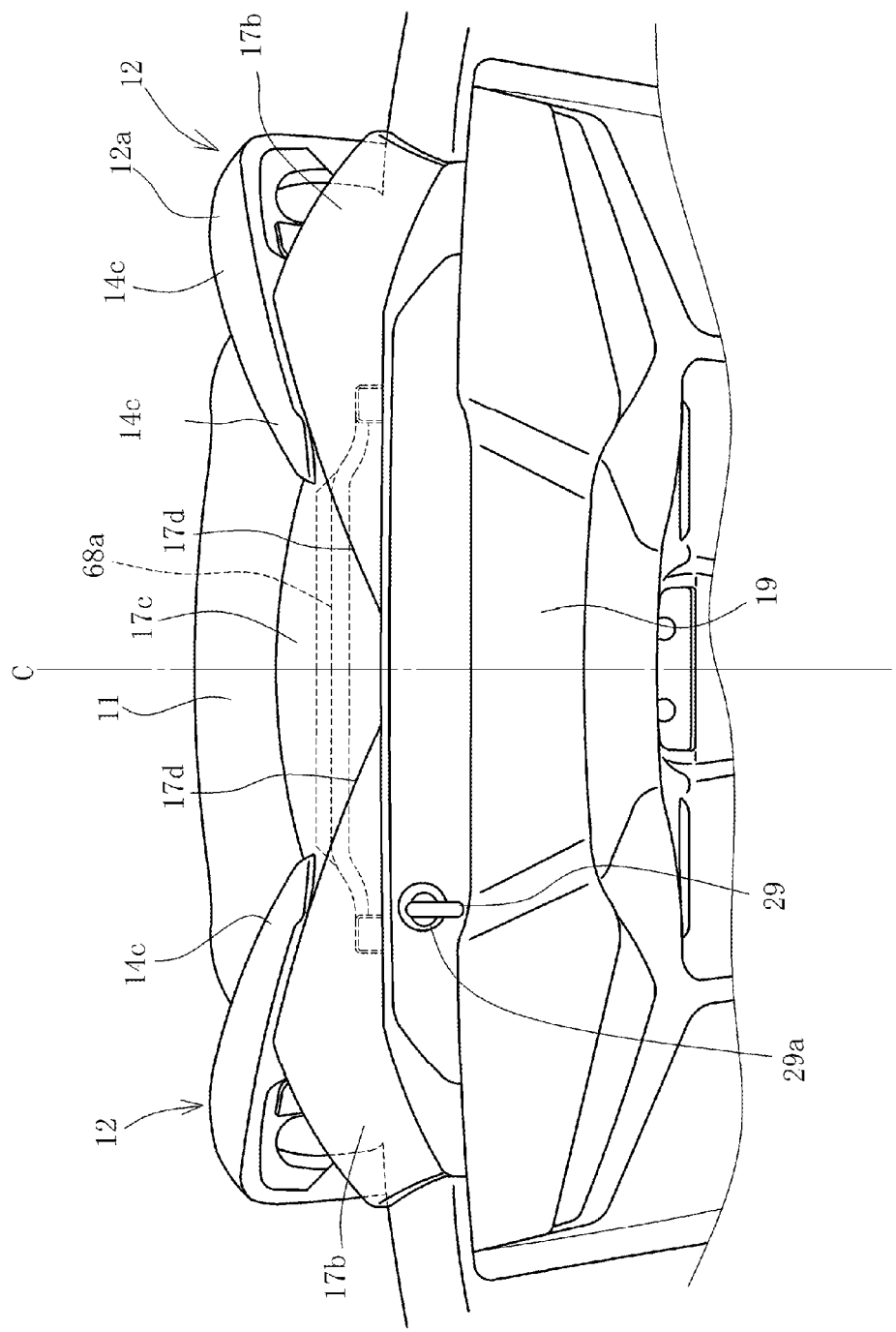
FIG. 5 is a rear view of the vehicle.

FIG. 3 is an enlarged side view of one of the grab rails 12 and its periphery. FIG. 4 is an enlarged plan view of a part including the passenger seat 11. FIG. 5 is an enlarged rear view of the grab rails 12 and their periphery in a rear part of the vehicle body.

In these drawings, the width of the passenger seat 11 is largest at its front portion 11*a* continuing from the backrest 10*a* and changes to be smaller in such a way that the passenger seat 11 becomes narrower gradually toward the rear. A rear end portion 11*c* has a substantially bell shape projecting rearward at the center in a plan view.

A seating portion of the passenger seat 11 for the passenger sit on has a seat edge portion 11*b* on its left, right, and rear sides. The seat edge portion 11*b* extends obliquely downward while spreading outwardly and connects to the upper surface of the rear center cover.

A front edge portion 17*a* of the rear center cover 17 is a recessed portion curving outward toward the rear in a plan view. The seat edge portion 11*b* and the rear end portion 11*c* of the passenger seat 11 are fitted to this recessed portion to have their peripheral portions overlap a flange portion formed on the front edge portion 17*a*. In this way, the peripheral portions of the seat edge portion 11*b* and the rear end portion 11*c* of the passenger seat 11 are located adjacent to the front edge portion 17*a*, thereby providing a link thereto.

A left front portion and a right front portion of the rear center cover 17 are respectively attached to the upper pipes 9*a* (FIG. 3) side with bolts 44 (FIG. 4), respectively, in the vicinity of the front edge portion 17*a*. Each bolt 44 is located under the extension portion 14 of the corresponding grab rail 12 and is therefore invisible from outside (see FIG. 4).

As shown in FIGS. 4 and 5, a center portion of the rear center cover 17 in the vehicle width direction is a recessed portion 17*c* lower than side portions 17*b*. The recessed portion 17*c* becomes narrower toward the rear. There is a stepped portion 17*d* at the boundary of each side portion 17*b* and the recessed portion 17*c*. Being sandwiched between the left and right stepped portions 17*d*, the recessed portion 17*c* corresponds to a groove-shaped recessed portion in the present application.

Each grab rail 12 is has a substantially dogleg shape in a side view; the grabbing portion 13 in the front extends obliquely upward toward the rear while the extension portion 14 in the rear extends downwardly rearward. The front attachment portion 15 and the rear attachment portion 16 of the grab rail 12 are attached respectively to stays 8*d* and 8*e* (see FIG. 3) provided on the joint plate 8*c* with a gap therebetween in the front-rear direction.

In a plan view, the grabbing portion 13 of the grab rail 12 is a small-width portion, and the width of the extension portion 14 is largest at a front portion thereof and changes to be smaller toward the rear.

The grabbing portion 13 bulges outward away from the front portion 11*a*, so that a grab space 30 to insert fingers is formed between a lateral portion of the front portion 11*a* and the grabbing portion 13.

The extension portion 14 of the grab rail 12 extends rearward between the passenger seat 11 and the upper side of the rear center cover 17 while decreasing the vertical gap between the extension portion 14 and the rear center cover 17. The extension portion 14 then enters the recessed portion 17*c*.

Accordingly, in the side view of FIG. 3, a lower portion of a rear portion 14*c* of the extension portion 14 is covered with the side portion 17*b* of the rear center cover 17. As a result, the rear portion 14*c* of the extension portion 14 appears thinner. Moreover, an attaching portion in a rear end portion of the rear portion 14*c* is hidden by the rear center cover 17. Hence, the exterior can be improved.

In the plan view of FIG. 4, the extension portion 14 of each grab rail 12 has an outer lateral surface 14*a* bulging outward beyond the seat edge portion 11*b* and has a rear portion inclining in such a way as to get closer to the center C of the vehicle body. An inner lateral surface 14*b* of the extension portion 14 inclines similarly to the outer lateral surface 14*a* but is situated inward of the seat edge portion 11*b*. In this way, the extension portion 14 hides the portion connecting the seat edge portion 11*b* and the front edge portion 17*a*. Note that a space like the grab space 30 under the grabbing portion 13 is not formed between the extension portion 14 and the seat edge portion 11*b*.

The rear portion 14*c* of the extension portion 14 extends rearward beyond the rear end portion 11*c* of the passenger seat 11 and overlaps the rear center cover 17 from above. This portion overlapping the rear center cover 17 is housed in the recessed portion 17*c* formed on the rear center cover 17 and extends along the inner side of the stepped portion 17*d*.

Moreover, the rear end portion of the rear portion 14*c* is engaged with the recessed portion 17*c* of the rear center cover 17 through an engagement protrusion 46 (FIG. 4) (details will be described later).

A lid opening lever 42 (see FIG. 3) is provided near and behind each rear attachment portion 16. Operating the lid opening levers 42 actuates the trunk opener to release the lid locks, thereby allowing the lids 22 and 23 to be opened.

The lid opening levers 42 are levers to hook a finger tip to operate the trunk opener of the lid 22 and the lid 23 of the left side trunk 20 and the right side trunk 21, and each housed in a generally triangular space between the corresponding extension portion 14 and the rear center cover 17. By disposing the lid opening levers 42 under the extension portions 14, one can avoid operating the lid opening levers 42 by unintentionally putting his or her fingers on them when gripping the grab rails 12.

The vertical gap between each extension portion 14 and the vehicle body is smaller than that between each grabbing portion 13 and the vehicle body. Each lid opening lever 42 is given under the corresponding extension portion 14 but above the rear center cover 17 and operates outwardly in the vehicle width direction from the lateral side of the vehicle body to open the corresponding lid.

The rear center cover 17 continuously covers the side trunks 20 and 21 and a rear part of the vehicle body and extends in the vehicle width direction from the seat edge portion 11*b*. The difference in level between the passenger seat 11 and the rear center cover 17 in the height direction is small. The upper surface of each grab rail 12 is substantially at the same height as the upper surface of the passenger seat 11. Each lid opening lever 42 not in use is situated within the corresponding grab rail 12 in the height direction and the width direction.

Each of portions of the rear center cover 17 above the side trunks 20 and 21 has a front end situated rearward of the passenger steps 27 (FIGS. 1 and 2) and forms a surface 17*f* extending upwardly rearward from the front end in such a way as to approach the upper surface of the grab rail 12 as extending rearward.

In a side view, each lid opening lever 42 is situated under the extension portion 14 of the grab rail 12 but above the surface 17*f* of the rear center cover 17 extending upwardly rearward.

The operation of the trunk opener is locked by means of the key cylinder 29*a* (see FIG. 5). The operation of the lid opening lever 42 is made unfunctional during the locked state, and the operation of the lid opening lever 42 is made functional during the unlocked state.

As shown in FIG. 5, the key cylinder 29*a* is provided on the left side of a rear end part of the vehicle body and performs the unlocking operation with the key 29 inserted into a key hole exposed from a rear cover 19.

The key cylinder 29*a* is provided as one member. The key cylinder 29*a* is attached to the rear cover 19, which is an exterior surface of the vehicle body, with only the key hole shown. The key cylinder 29*a* permits only the specific key 29 to pivot a key-cylinder lever 29*c* (FIG. 11) to perform an unlocking action.

Figure 6:
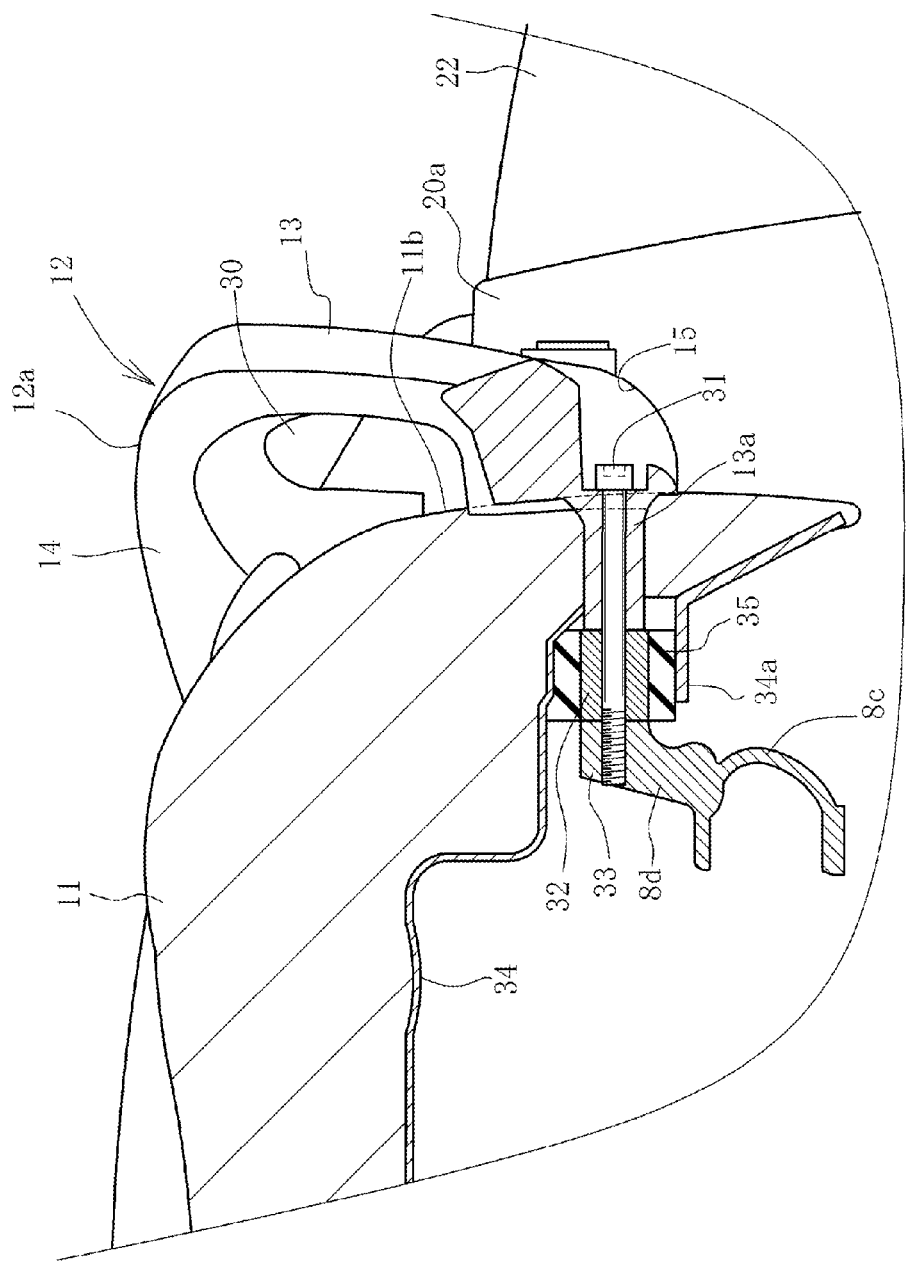
FIG. 6 is a cross-sectional view taken along line 6-6 in FIG. 3.
Figure 7:
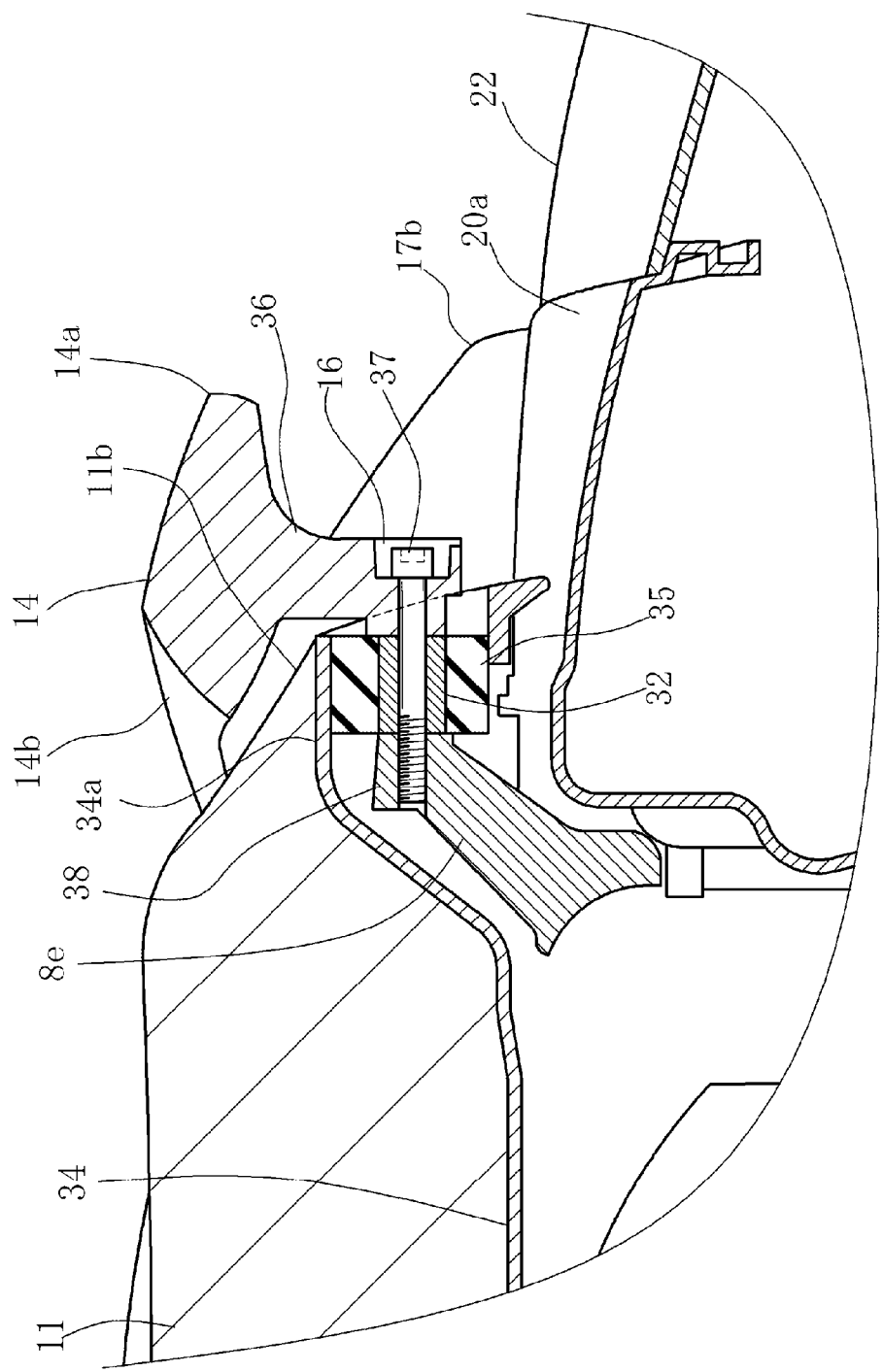
FIG. 7 is a cross-sectional view taken along line 7-7 in FIG. 3.
Figure 8:
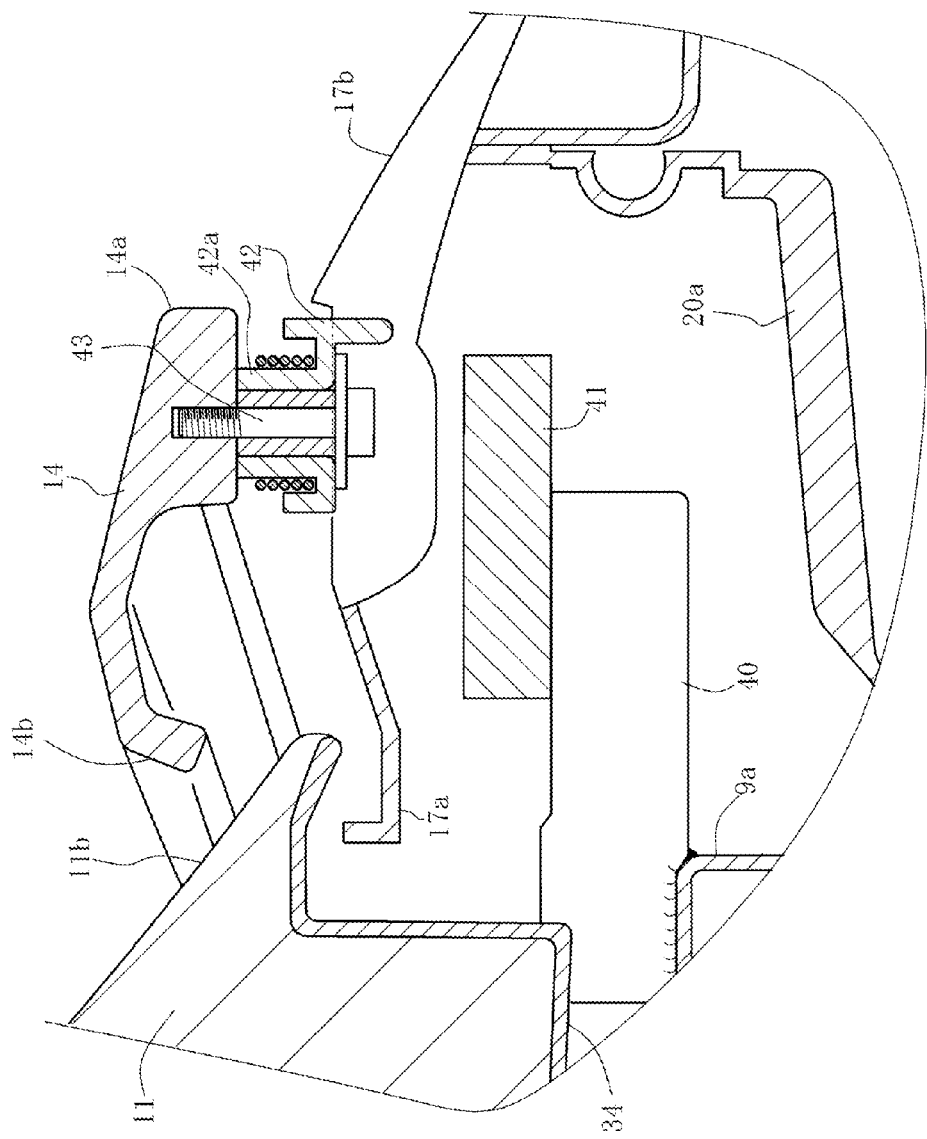
FIG. 8 is a cross-sectional view taken along line 8-8 in FIG. 3.

FIG. 6 is a cross-sectional view taken along line 6-6 in FIG. 3. Note that although FIGS. 6 to 8 show only partial cross sections of the left side, the right side is symmetrical. The front attachment portion 15 provided at a front end portion of the grabbing portion 13 forms a boss 13*a* projecting to the inner side of the vehicle body. At the boss 13*a*, the front attachment portion 15 is fastened with a bolt 31 to a nut portion 33 of the stay 8*d*, provided to the joint plate 8*c* of the seat rail 8, together with a lateral portion of the passenger seat 11.

The seat edge portion 11*b* of the passenger seat 11 is an inclining portion extending downwardly rearward from the seating portion. An attachment hole is formed through this inclining portion in the vehicle width direction. The boss 13*a* is fitted in this through-hole. A bottom plate 34 of the passenger seat 11 is provided with an attachment boss 34*a* at a lateral portion thereof, and a cushion rubber 35 is fitted in and supported on the attachment boss 34*a*. A collar 32 is fitted in an axial portion of the cushion rubber 35.

The bolt 31 is fastened into the nut portion 33 with the inner lateral surface and outer lateral surface of the collar 32 being put in contact with the nut portion 33 and the tip of the boss 13*a*, respectively.

In this attached state, the grabbing portion 13 is close to the seat edge portion 11*b* to such an extent that part thereof is situated under and vertically overlaps the grabbing portion 13. The passenger can easily grab the grabbing portion 13 by making the gap between the grabbing portion 13 and the seat edge portion 11*b* smaller to set the grabbing portion 13 closer to the seating portion.

FIG. 7 is a cross-sectional view taken along line 7-7 in FIG. 3. The rear attachment portion 16 is provided at a lower end portion of a stay 36 formed projecting downward from the vicinity of the boundary of the grabbing portion 13 and the extension portion 14. The rear attachment portion 16 is fastened with a bolt 37 to a nut portion 38 of the stay 8*d*, provided to the stay 8*e* of the seat rail 8, together with the passenger seat 11. The cushion rubber 35 and the collar 32 are interposed between the nut portion 38 and the stay 36.

In this attached state, the lateral portion of the passenger seat 11 overlaps the extension portion 14 from below, and there is only a small gap between the seat edge portion 11*b* and the lower surface of the extension portion 14. The seat edge portion 11*b* is connected smoothly to the upper surface of the left side trunk 20 (the same applies to the right side trunk 21).

By the attachment at the front attachment portion 15 and the rear attachment portion 16, the seat 7 is fastened to the seat rail 8 together with the grab rail 12. Here, the grab rail 12 is fastened together by utilizing the attachment portions of the seat 7 to the seat rail 8.

FIG. 8 is a cross-sectional view taken along line 8-8 in FIG. 3. A base portion 42*a* of the lid opening lever 42 is pivotally attached from below to the lower surface of a middle portion, in the front-rear direction, of the extension portion 14 near a front end portion of the rear center cover 17 through a pivot center shaft 43. The lid opening lever 42 is engaged with a lid opening mechanism 41 attached to the upper side of an opener stay 40 fixed to the upper side of the upper pipe 9*a*. Pivoting the lid opening lever 42 actuates the lid opening mechanism 41 to release the lid locks 52. Details will be described later.

Part of the rear center cover 17 is in a space under the extension portion 14 and, in the space under the extension portion 14, overlaps the passenger seat 11 from below. The body portion 20*a* of the left side trunk 20 is disposed outward of the lid opening mechanism 41 so as to avoid it.

Note that the lid opening mechanism 41 in the drawing is illustrated schematically. The lid opening lever 42 is provided symmetrically to the right grab rail 12, and the lid opening mechanism 41 is provided in the same manner. Thus, pivoting the right lid opening lever 42 can release the lid locks 56 (FIG. 4) in the right side trunk 21.

In the above-described portion around the lid opening lever 42, the seat edge portion 11*b* of the passenger seat 11 is partly situated under the extension portion 14 of the grab rail 12 with a gap between itself and the lid opening lever 42 (see FIG. 3). Moreover, the front end portion of the rear center cover 17 is located below the lid opening lever 42. Thus, there is enough space to pivot the lid opening lever 42.

Figure 9:
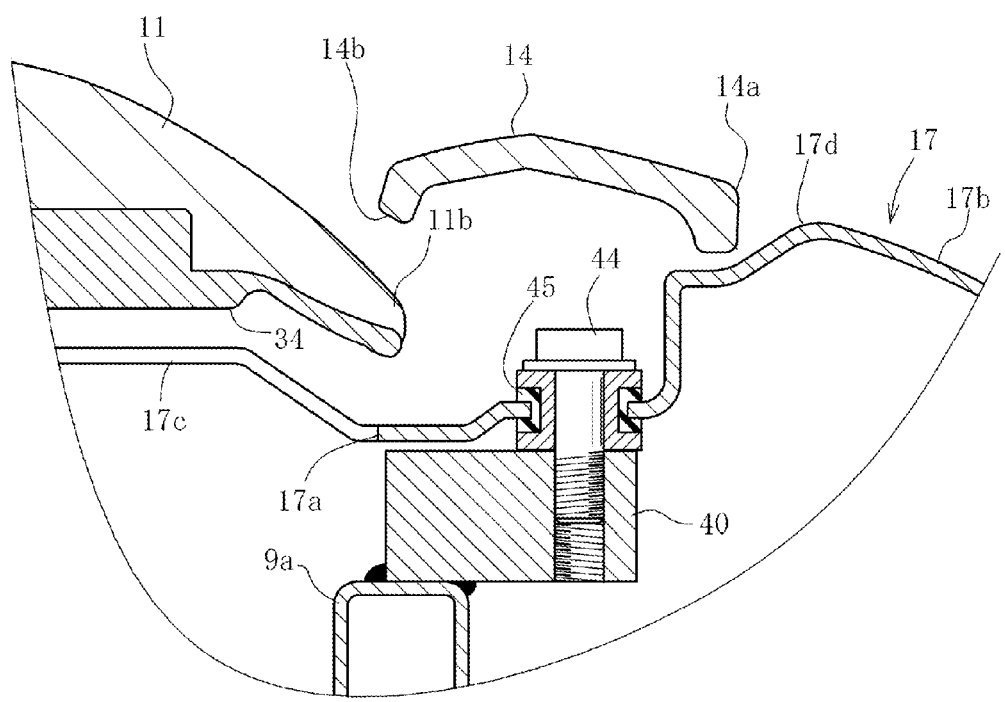
FIG. 9 is a cross-sectional view taken along line 9-9 in FIG. 3.

FIG. 9 is a cross-sectional view taken along line 9-9 in FIG. 3. Front left and front right portions of the front edge portion 17*a* of the rear center cover 17 are each fastened to the upper pipe 9*a* side with a bolt 44 through a grommet 45. This fastening portion is located under the extension portion 14 of the grab rail 12. Thus, the fastening portion is covered with and hidden by the extension portion 14 of the grab rail 12 from above and is therefore invisible from outside.

Meanwhile, there is a slight gap between the lower surface of the extension portion 14 of the grab rail 12 and the upper surface of the recessed portion 17*c* of the rear center cover 17, so that the extension portion 14 makes no contact with the recessed portion 17*c*. In this way, the recessed portion 17*c* of the rear center cover 17 is prevented from being damaged.

Moreover, the seat edge portion 11*b* of the passenger seat 11 is situated under the rear portion 14*c* as well, and the portion connecting the seat edge portion 11*b* and the front edge portion 17*a* is covered with the extension portion 14 as well. Part of the recessed portion 17*c* given inward of the grab rail 12 overlaps the passenger seat 11 from below as well.

Figure 10:
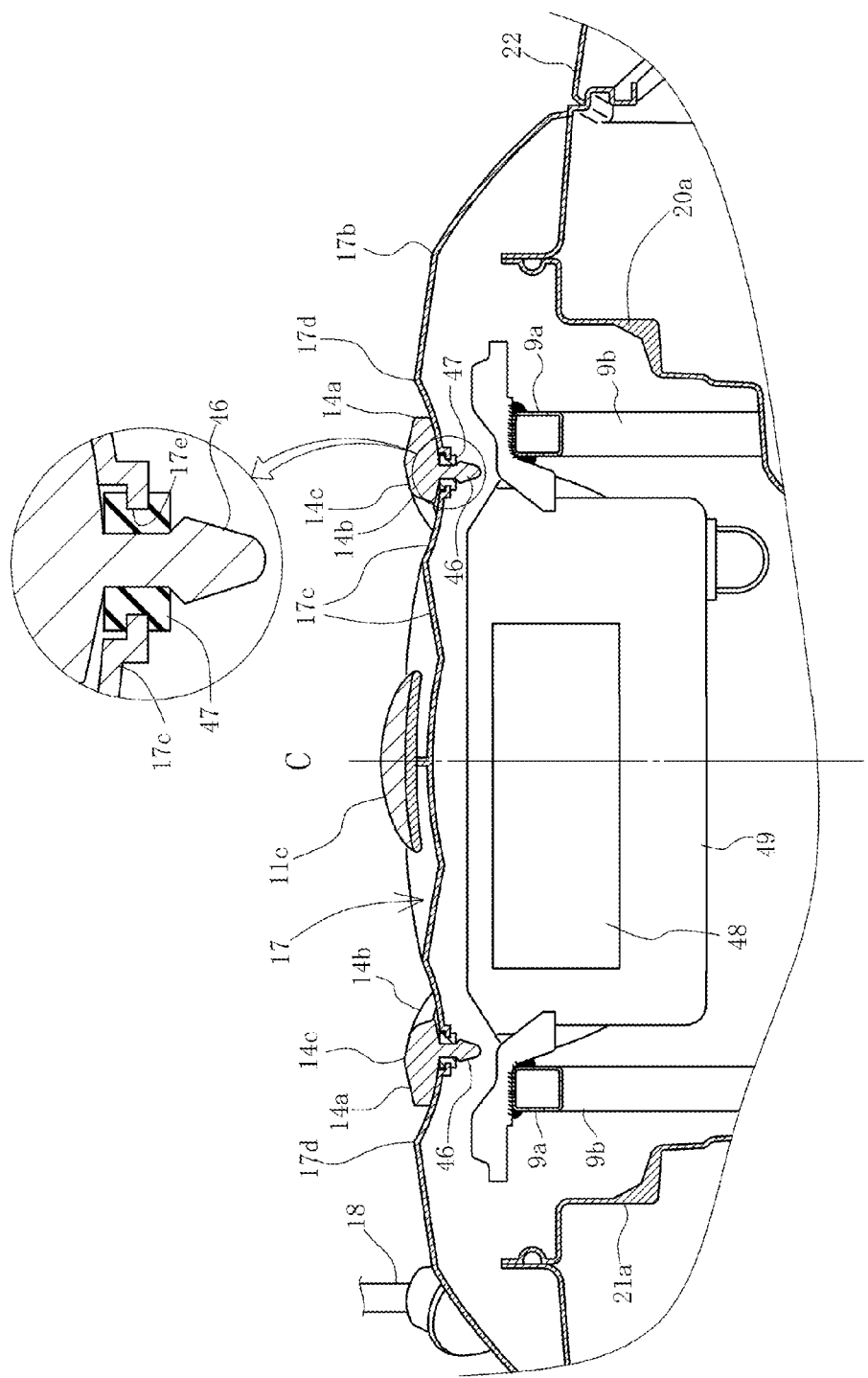
FIG. 10 is a cross-sectional view taken along line 10-10 in FIG. 3.

FIG. 10 is a cross-sectional view taken along line 10-10 in FIG. 3. The rear end portion of the rear portion 14*c* in the extension portion 14 of the grab rail 12 integrally includes the engagement protrusion 46 projecting downward from the bottom thereof. The engagement protrusion 46 is attached, or engaged, to the recessed portion 17*c* of the rear center cover 17.

As shown in the enlarged part in the drawing, a grommet 47 is attached to an engagement hole 17*e* provided in the recessed portion 17c. The engagement protrusion 46 is engaged with the engagement hole 17e through the grommet 47.

Accordingly, the front side of the grab rail 12 is fastened to the seat rail 8 side through the front attachment portion 15 and the rear attachment portion 16, while the rear side of the grab rail 12 is fixed in such a way as to absorb vibrations by engaging the rear end portion of the rear portion 14c with the recessed portion 17c of the rear center cover 17.

A rear portion of the rear portion 14c enters the recessed portion 17c of the rear center cover 17. The bottom of the rear portion is in contact with the surface of the recessed portion 17c while the top thereof is at substantially the same height as the stepped portion 17d.

Thus, the rear portion 14c of the extension portion 14 approaches or contacts the upper side of the rear center cover 17, and there is hardly a gap between the rear portion 14c and the rear center cover 17.

Consequently, fingers cannot be put under the extension portion 14. Thus, the grabbing area in the grab rail 12 can be limited to the grabbing portion 13. Moreover, by making the extension portion 14 ungrabbable, one can quickly find the grabbing portion 13 when trying to find the grabbing portion 13 by touch. Moreover, the extension portion 14 which has relatively low support stiffness as a result of being simply engaged with the rear center cover 17 can be prevented from being grabbed.

Electrical equipment 48 is disposed under the rear center cover 17. The electrical equipment 48 is, for example, an audio device housed in a storage box 49 and covered with the rear center cover 17 from above. The electrical equipment 48 is supported on a stay 48a (see FIG. 5) supported between the left and right upper pipes 9a. The storage box 49 is supported on the left and right upper pipes 9a.

When the electrical equipment 48 housed in the storage box 49 is an audio device, it can be connected to the antenna 18 located adjacent thereto via the shortest route and receive radio waves and the like through the antenna 18.

Next, operations of this embodiment will be described. As shown in FIG. 4, the extension portion 14 of each grab rail 12 extends from the passenger seat 11 over the rear center cover 17 in such a way as to cross between the upper surface of the seat 7 and the upper surface of the rear center cover 17 in a plan view. Moreover, the extension portion 14 of each grab rail 12 extends rearward while decreasing the gap between the extension portion 14 and the rear center cover 17. The decreasing gap between the extension portion 14 and the rear center cover 17 makes the extension portion 14 ungrabbable and makes only the grabbing portion 13 grabbable. Moreover, the extension portion 14 covers the seam between the seat 7 and the rear center cover 17. Accordingly, the extension portion 14 can protect this seam portion and prevent a scratch and the like from being made thereon.

Moreover, the attachment of the rear end portion of the extension portion 14 to the rear center cover 17 can not only correct the positional relationship between the grab rail 12 and the rear center cover 17 but also reinforce the rear center cover 17 by use of the rigidity of the extension portion 14. Furthermore, the attachment of the rear end portion can be done easily by the engagement thereof.

Next, the trunk opener will be described in detail.

Figure 11:
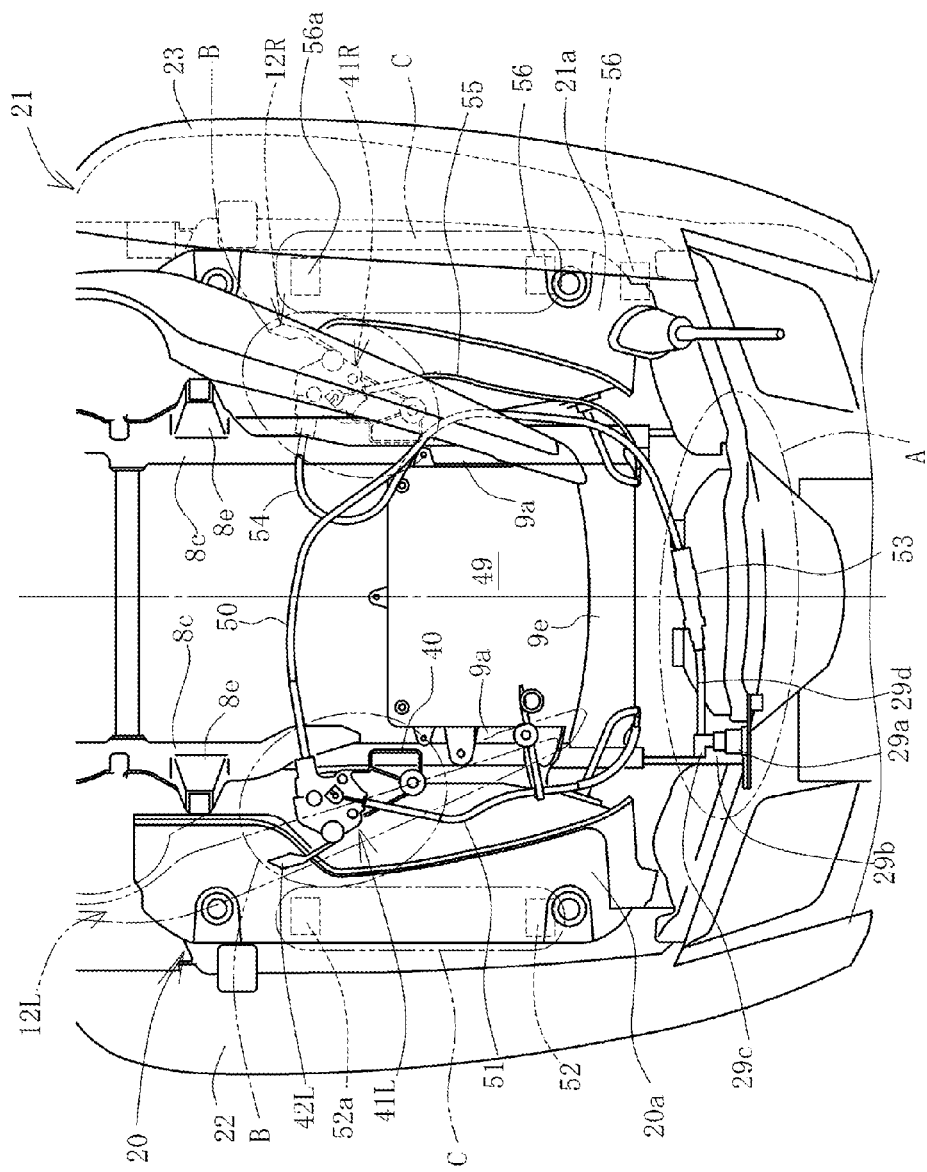
FIG. 11 is a plan view of a rear part of a vehicle body showing the entire layout of a trunk opener.

FIG. 11 is a plan view of a rear part of the vehicle body showing the entire layout of the trunk opener with the seat 7, the rear center cover 17, etc. being removed. Moreover, to facilitate understanding, the left grab rail 12 is illustrated with a phantom line to show the portions therebelow.

Furthermore, the portions provided in a left and right pair are given a suffix letter R for the right one and a suffix letter L for the left one when they need to be distinguished particularly from each other.

In this drawing, the left and right upper pipes 9a are in parallel with each other, and their rear ends are coupled to a cross plate 9e. A space surrounded by the left and right upper pipes 9a and the cross plate 9e is a space to arrange the storage box 49. Attachment portions of the storage box 49 projecting leftward and rightward are laid over and supported on the left and right upper pipes 9a.

A stay 29b projects rearward from the rear end of the left upper pipe 9a and supports the key cylinder 29a.

The trunk opener includes a key-cylinder part A including the key cylinder 29a, a lid-opening-mechanism part B, and a lid-lock part C. The key-cylinder part A is provided in one location in the left side of the rear part of the vehicle body while the lid-opening-mechanism part B and the lid-lock part C are each provided in a pair in the left and right sides of the vehicle body. The key-cylinder part A is formed of the key cylinder 29a, an equalizer input cable 29d, and an equalizer 53.

The lid-opening-mechanism parts B are formed of the lid opening levers 42 and the lid opening mechanisms 41 each given in a left and right pair and are coupled to the key-cylinder part A through a left key-locking cable 50 and a right key-locking cable 54, respectively.

The lid-lock parts C are formed of the left lid locks 52 provided in a front and rear pair to the left side trunk 20 and the right lid locks 56 provided in a front and rear pair to the right side trunk 21, respectively. The lid-lock parts C are coupled to the lid-opening-mechanism parts B through a left lid-locking cable 51 and a right lid-locking cable 55, respectively.

Hereinbelow, details of these parts will be described. The key cylinder 29a forming the key-cylinder part A is provided with the key-cylinder lever 29c which is permitted to pivot inside a cylinder body of the key cylinder 29a only upon operation with the specific key 29. The equalizer input cable 29d coupled at one end to the key-cylinder lever 29c to be windable is connected to the left end of the equalizer 53. The left key-locking cable 50 and the right key-locking cable 54 extend from the right end of the equalizer 53 to the right side in the drawing.

Upon the unlocking operation of the key cylinder 29a with the key 29, that operating force is inputted through the equalizer input cable 29d to the equalizer 53, which in turn pulls the left key-locking cable 50 and the right key-locking cable 54 simultaneously. The equalizer input cable 29d, the equalizer 53, the left key-locking cable 50, and the right key-locking cable 54 form a transmission portion to transmit the pivot of the key-cylinder lever 29c caused by the unlocking operation to the multiple lid-opening-mechanism parts B through multiple passages.

The left key-locking cable 50 is wired to extend from the rear side of the storage box 49 to the right and front sides thereof. Specifically, the left key-locking cable 50 extends rightward along the rear side of the cross plate 9e and further extends frontward along the right upper pipe 9a under the right grab rail 12R until reaching the front side of the storage box 49. There, the left key-locking cable 50 bends leftward again and connects to the left lid opening mechanism 41L supported on the left upper pipe 9a.

The left key-locking cable 50 transmits a key-cylinder releasing operation in the key cylinder 29a to the left lid opening mechanism 41L and permits the operation of the left lid opening lever 42L to unlock the left lid locks 52 in the left lid opening mechanism 41L.

The right key-locking cable 54 extends around the cross plate 9e and the right upper pipe 9a from the equalizer 53 while substantially overlapping with the left key-locking cable 50. A tip portion bends rightward and connects to the right lid opening mechanism 41R (below the right grab rail 12R) provided at such a position on the right upper pipe 9a as to substantially face the left lid opening mechanism 41L.

The right key-locking cable 54 transmits the key-cylinder releasing operation in the key cylinder 29a to the right lid opening mechanism 41R and permits the operation of the right lid opening lever 42R to unlock the right lid locks 56 in the right lid opening mechanism 41R.

The one key-cylinder part A is capable of simultaneously releasing the key-locked states of the two lid-opening-mechanism parts B. That is, operating the one key cylinder 29a simultaneously releases the key-locked states of the left lid opening mechanism 41L and the right lid opening mechanism 41R.

The lid-opening-mechanism parts B are formed of the left and right lid opening levers 42L and 42R pivotally attached to the lower surfaces of the left and right grab rails 12L and 12R and the like, and the left and right lid opening mechanisms 41L and 41R given below the left and right lid opening levers 42L and 42R and fixed to the vehicle body frame side, respectively. In the key-locked state, operating the lid opening levers 42L and 42R is not functional, thus causing no action of the left and right lid opening mechanisms 41L and 41R.

When the key-locked state is released, operating the lid opening levers 42L and 42R becomes functional, thereby performing unlocking actuation of the left and right lid opening mechanisms 41L and 41R to release the left lid locks 52 and the right lid locks 56 (the structure of each lid opening mechanism will be described later in detail).

The unlocking actuation in the left lid opening mechanism 41L involves pivoting the left lid opening lever 42L counterclockwise as viewed in the drawing on the condition that the key-locked state is released, to thereby pull the left lid-locking cable 51. As a result, the left lid locks 52 are released.

The left lid-locking cable 51 extends rearward from the left lid opening mechanism 41L along the left upper pipe 9a and enters the inside of the left side trunk 20 from the vicinity of the rear end of the left upper pipe 9a. The left lid-locking cable 51 then connects to the left lid locks 52 provided in an upper portion of the left side trunk 20 in the vicinity of where the lid 22 is supposed to engage.

The same applies to the right lid opening mechanism 41R. Here, the right lid opening mechanism 41R is provided symmetrical to the left side, and therefore pivoting the right lid opening lever 42R clockwise as viewed in the drawing pulls the right lid-locking cable 55 and thereby releases the right lid locks 56.

The right lid-locking cable 55 extends rearward from the right lid opening mechanism 41R along the right upper pipe 9a and enters the inside of the right side trunk 21 from the vicinity of the rear end of the right upper pipe 9a. The right lid-locking cable 55 then connects to the right lid locks 56 provided in an upper portion of the right side trunk 21 in the vicinity of where the lid 23 is supposed to engage.

Next, the left lid opening lever 42L and the left lid opening mechanism 41L will be described in detail. Note the same applies to the right side of the vehicle body.

Figure 12:
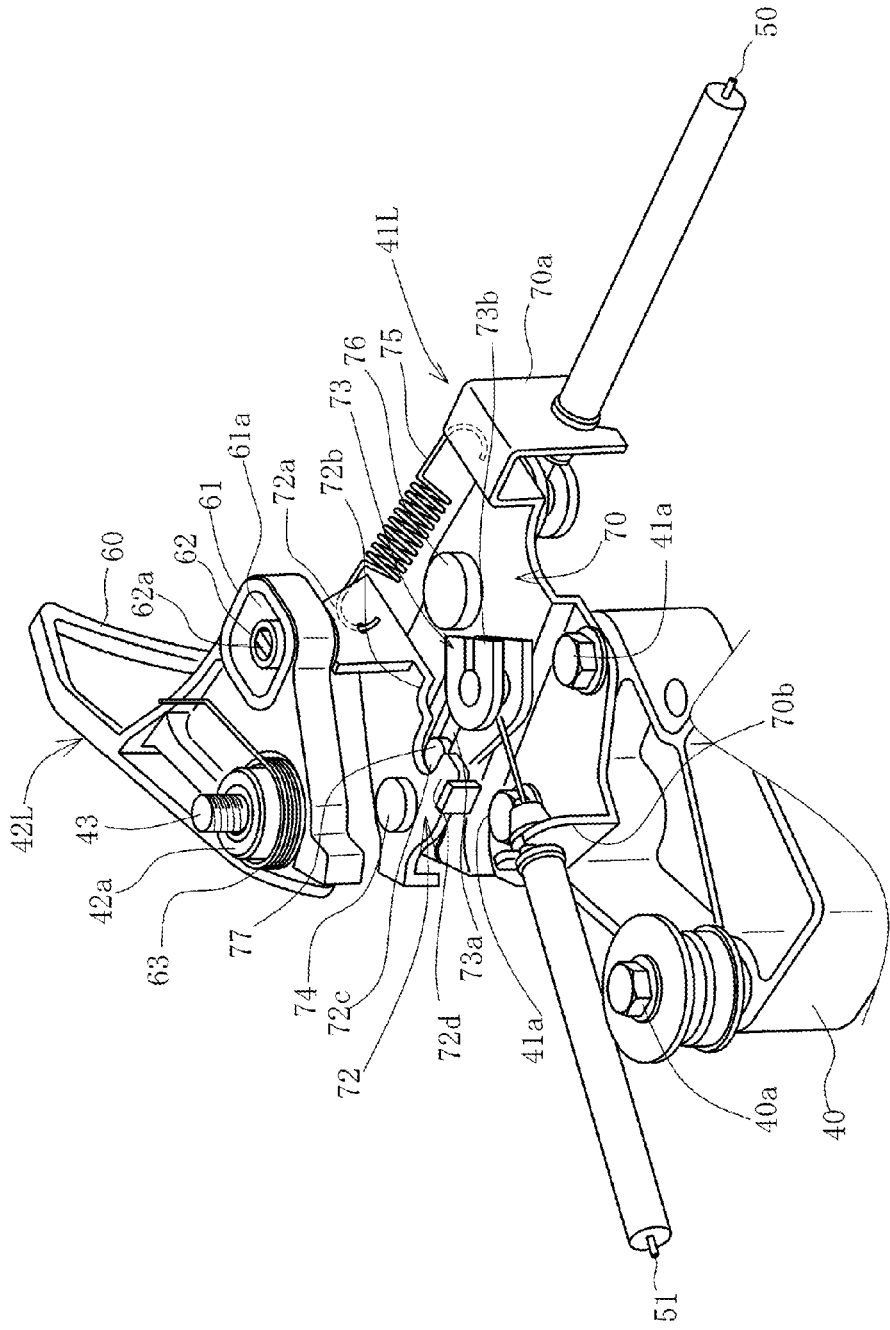
FIG. 12 is a perspective view of a lid-opening-mechanism part.
Figure 13:
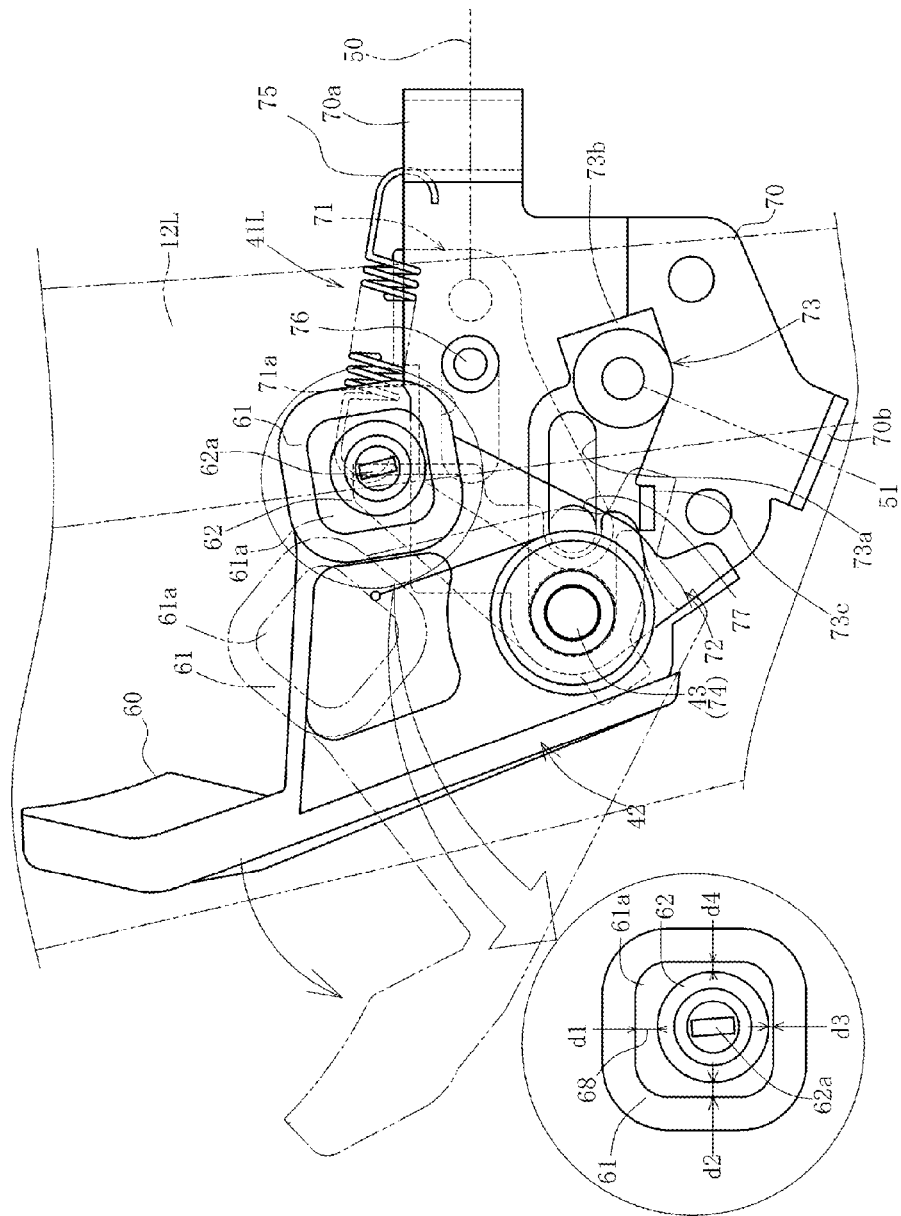
FIG. 13 is a plan view of the lid-opening-mechanism part.

FIG. 12 is a perspective view of the lid-opening-mechanism part B formed of the left lid opening mechanism 41L and the left lid opening lever 42L, and FIG. 13 is a plan view thereof.

The left lid opening mechanism 41L is attached with bolts 41a to the stay 40 which is fixed with a bolt 40a to the upper pipe 9a.

On the other hand, the left lid opening lever 42L is pivotally attached to the lower surface of the grab rail 12 given above through the pivot center shaft 43. A predetermined vertical gap is provided between the left lid opening lever 42L and the left lid opening mechanism 41L.

The left lid opening lever 42L is made of a material with appropriate rigidity such as a synthetic resin and has a generally triangular shape in a plan view. The pivot center shaft 43 is attached at one corner, a finger hook portion 60 is provided at another corner, and an engagement portion 61 is provided at the remaining corner.

The engagement portion 61 is formed in an angular tube shape in a plan view, and the inner space thereof is an engagement hole 61a. The engagement hole 61a houses a cylindrical curved surface portion 62. The engagement hole 61a in the engagement portion 61 is larger than the outer diameter of the curved surface portion 62. The curved surface portion 62 is designed such that the curved surface portion 62 can be housed with a slight gap 68 therearound by taking assembly errors into account. The gap 68 serves as a gap to absorb the errors.

The curved surface portion 62 is attached by means of an attachment shaft 62a which is welded to the upper end of an engagement protrusion 72a extending from the left lid opening mechanism 41L given below. The engagement protrusion 72a is formed by upwardly bending one end portion of a lock plate 72 (details will be described later) forming the left lid opening mechanism 41L.

Moreover, as shown in FIG. 13, an outer peripheral portion of the engagement portion 61 has a generally square shape. Here, the engagement portion 61 is designed such that the center of the curved surface portion 62 is located off the center of the engagement hole 61a in the assembled state. Thus, the gap 68 between the curved surface portion 62 and the engagement portion 61 in the assembled state has such directional characteristics that the gap 68 differs between the front and rear, the left and right, etc.

The enlarged part in FIG. 13 shows the gap 68 in detail. The gap 68 is formed between the outer peripheral surface of the curved surface portion 62 and the inner peripheral surface of the engagement portion 61 surrounding the engagement hole 61a. The gap 68 has different sizes d1 to d4 in the directions of two orthogonal axes passing through the center of the curved surface portion 62. Thus, the gap 68 has such directional characteristics that the size of the gap 68 appears different depending upon the direction.

The directional characteristics of the gap 68 are set by reflecting the fact that the positional error which actually occurs in the assembly differs between the front and rear, the left and right, etc.

The initial position of the engagement portion 61 in the assembly is determined by a coil spring 63 provided around the pivot center shaft 43. The coil spring 63 is wound around an outer peripheral portion of the base portion 42a. Both ends of the coil spring 63 are fixed to the left lid opening lever 42L and the grab rail 12, respectively, when the left lid opening lever 42L is attached to the grab rail 12 through the pivot center shaft 43. In this way, the left lid opening lever 42L is pivotally biased clockwise as viewed in the drawing, thereby pivoting the engagement portion 61 to the initial position. The initial position set by the coil spring 63 gives predetermined directional characteristics to the gap between the engagement portion 61 and the curved surface portion 62 in the assembly.

Note that the saddle-ride type vehicle is not necessarily limited to the use of the coil spring 63 and may employ a metal spring such as a plate spring or an appropriate elastic member made of rubber or the like as long as it is capable of pivotally biasing the left lid opening lever 42L to a predetermined position.

By employing the engagement structure of the curved surface portion 62 and the engagement portion 61 as described above, the attachment structure of the left lid opening lever 42L attached to the grab rail 12 and the left lid opening mechanism 41L attached to the upper pipe 9a causes no influence, i.e. absorbing the assembly errors. Accordingly, the assembly can be done easily.

The outer peripheral surface of the curved surface portion 62 is a curved surface and comes in contact with the inner surface of the engagement portion 61 through that curved surface. A smooth engagement state can be maintained even when the contact surface of the engagement portion 61 shifts as a result of pivoting the lid opening lever 42.

Note that the left lid opening lever 42L includes the finger hook portion 60 at a front portion thereof and the pivot base portion 42a, which the pivot center shaft 43 is inserted through, at a rear portion thereof, and the height in level of a front end portion of the finger hook portion 60 is set larger than the height in level of the pivot base portion 42a.

Reference numeral 70a in the drawing is a cable supporting portion formed by bending a base 70 so as to support one end portion of a covering tube covering the left key-locking cable 50. Reference numeral 70b is a cable supporting portion for supporting one end portion of a covering tube of the left lid-locking cable 51.

A return spring 75 is attached between the cable supporting portion 70a and the lock plate 72 (details will be described later) which is pivoted through the left lid opening lever 42L. The return spring 75 pivotally biases the lock plate 72 clockwise.

Figure 14:
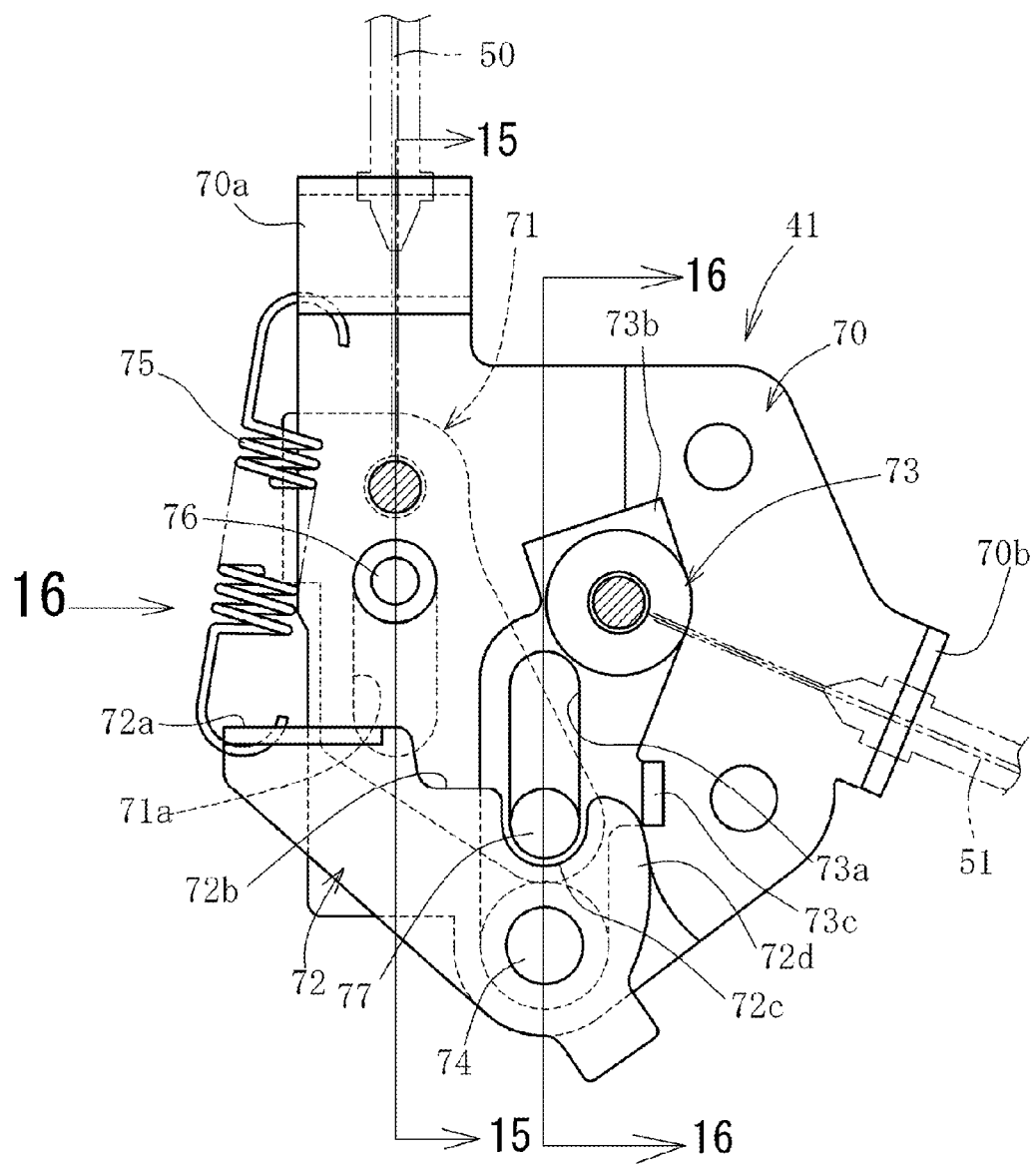
FIG. 14 is a plan view of a left lid opening mechanism.
Figure 15:
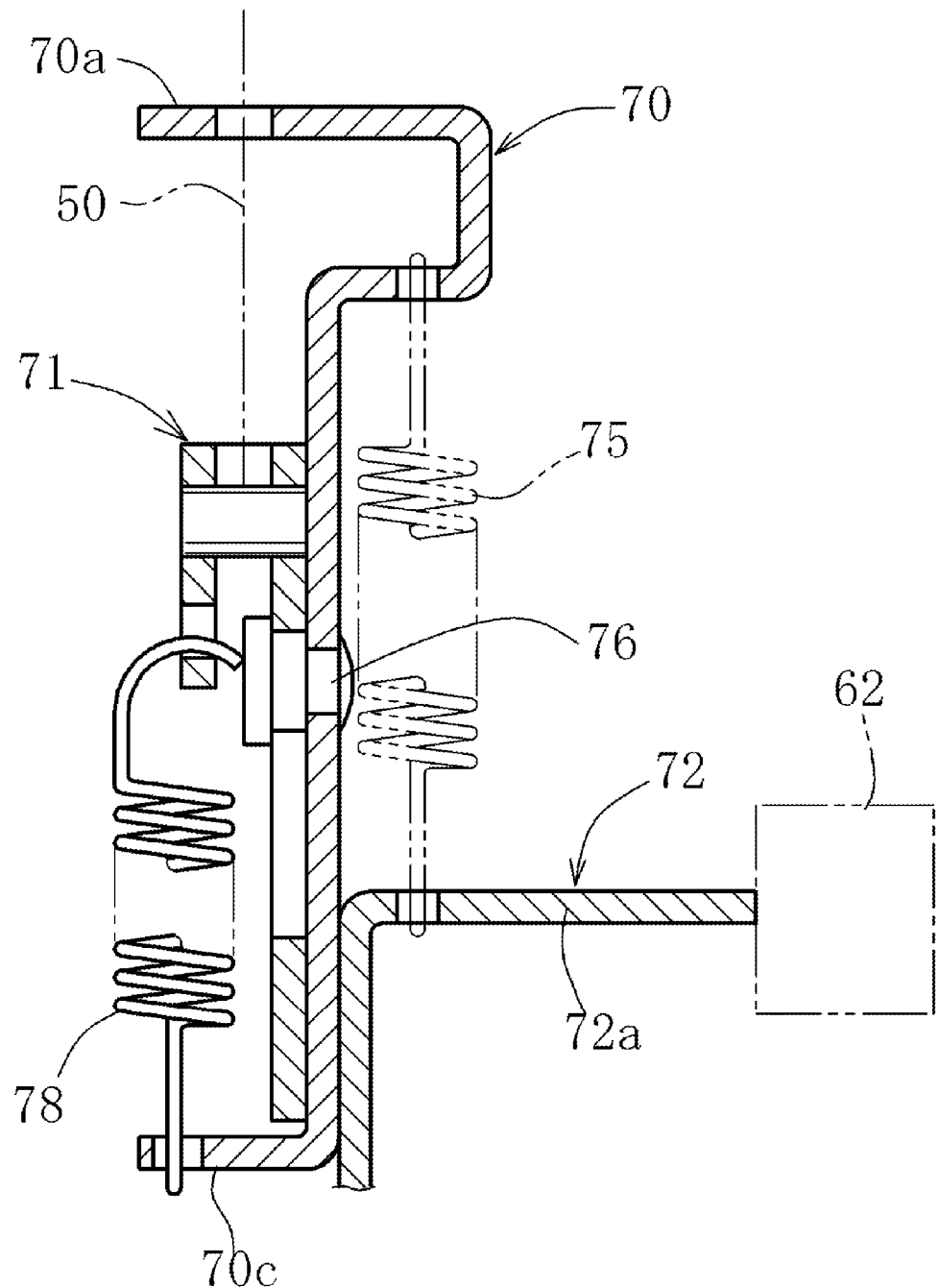
FIG. 15 is a cross-sectional view taken along line 15-15 in FIG. 14.
Figure 16:
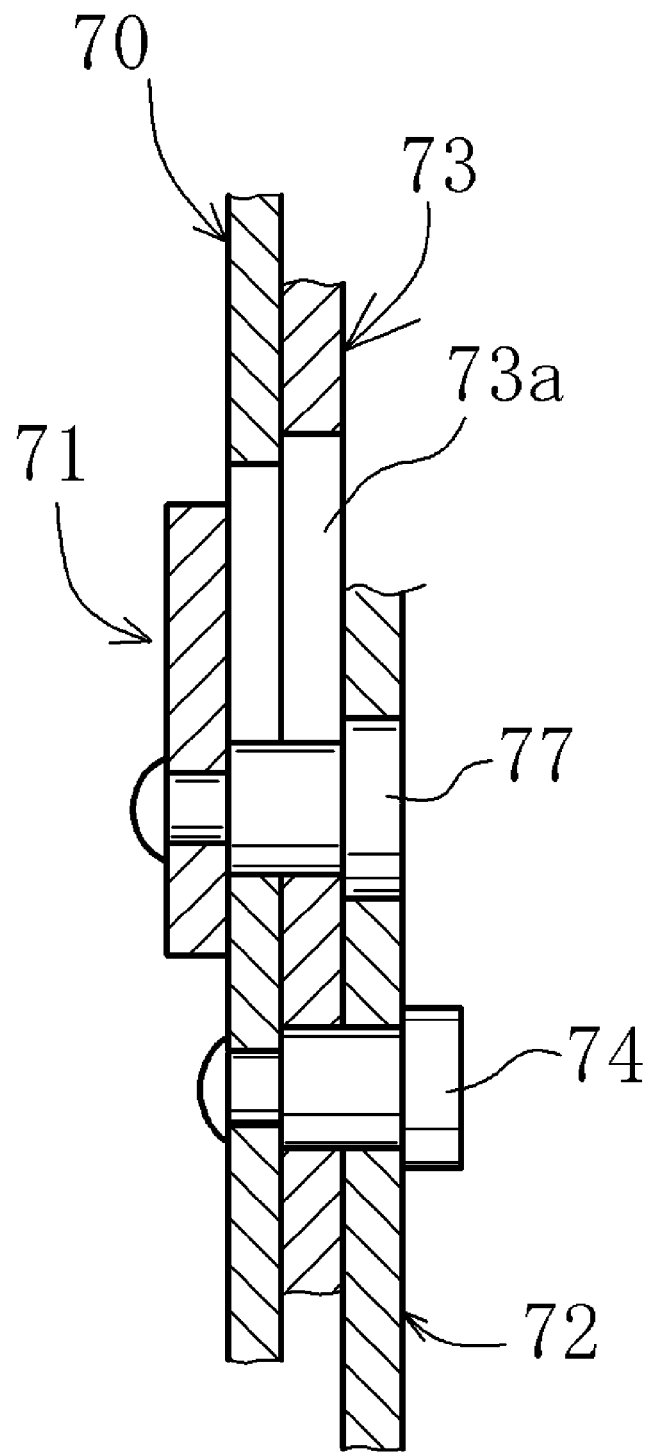
FIG. 16 is a cross-sectional view taken along line 16-16 in FIG. 14.

FIG. 14 is a plan view of the left lid opening mechanism 41L. FIG. 15 is a cross-sectional view taken along line 15-15 in FIG. 14. FIG. 16 is a cross-sectional view taken along line 16-16 in FIG. 14. As shown in these drawings, the left lid opening mechanism 41L includes: the base 70 which is attached to the stay 40; a first plate 71 which is moved forward and backward through the left key-locking cable 50; the lock plate 72 which is pivoted through the lid opening lever 42; and a second plate 73 which is connected to the left lid-locking cable 51.

The lock plate 72 and the second plate 73 are fastened together to the base 70 in such a manner as to be pivotable relative thereto through a first pivot shaft 74 which is coaxial with the pivot center shaft 43 of the left lid opening lever 42L.

The first plate 71 has a first elongated hole 71a, into which a guide pin 76 provided to the base 70 is inserted so that the first plate 71 can be moved forward and backward in the longitudinal direction of the first elongated hole 71a by being pulled by the left key-locking cable 50. Moreover, movement of the first plate 71 is biased in the direction the left key-locking cable 50 slackens by a return spring 78 laid between the first plate 71 and a bent portion 70c (FIG. 15) of the base 70. In the following, movement in the pulling direction of the left key-locking cable 50 is referred to as advance, and the opposite thereof is referred to as retreat.

Moreover, of both end portions of the first elongated hole 71a in the longitudinal direction, one adjacent to the guide pin 76 after the first plate 71 is retreated is referred to as a retreat-side end portion, and the opposite one is referred to as an advance-side end portion.

The first plate 71 is generally triangular in a plan view, and an engagement pin 77 provided at one of its corners is fitted in a second elongated hole 73a provided in the second plate 73. Thus, the engagement pin 77 can be moved forward and backward within the second elongated hole 73a along with the forward and backward movement of the first plate 71.

The second elongated hole 73a in the second plate 73 is substantially parallel to the first elongated hole 71a. Of both end portions of the second elongated hole 73a in the longitudinal direction, one at the retreat limit position of the engagement pin 77 in the retreat of the first plate 71 is referred to as a retreat-side end portion, and one on the opposite side, or at the advance limit position of the engagement pin 77 in the advancement is referred to as a advance-side end portion.

A cable connecting portion 73b is provided on the free-end side of the second plate 73 and catches one end of the left lid-locking cable 51.

In a surface of the lock plate 72 that crosses the second elongated hole 73a, a first recessed portion 72b and a second recessed portion 72c are provided which differ from each other in distance from the first rotary shaft 74. Of these, the first recessed portion 72b has a stepped shape having a longer distance from the first rotary shaft 74. When the lock plate 72 is pivoted in a return direction by the return spring 75 during the advancement of the engagement pin 77, the first recessed portion 72b overlaps the second elongated hole 73a.

The second recessed portion 72c is a recessed portion of a generally U shape having a shorter distance from the first rotary shaft 74. When the lock plate 72 is pivoted counterclockwise against the return spring 75, the second recessed portion 72c can overlap the retreat-side end portion of the second elongated hole 73a and can be fitted on the engagement pin 77 in the retreated state.

Of portions surrounding second recessed portion 72c, the portion on the opposite side from the first recessed portion 72b forms an engagement claw 72d. The engagement claw 72d can be engaged with the engagement pin 77 and pivoted together with the lock plate 72 when the lock plate 72 is pivoted counterclockwise. Moreover, the outer end surface of a tip portion of the engagement claw 72d can contact an interlocking protrusion 73c formed by bending part of the second plate 73.

Next, the operation of the lid opening mechanism 41 will be described. FIGS. 17(a)-17(d) are views schematically describing the operation, and FIG. 17(a) shows a key-locked state. In this state, the first plate 71 is advanced to such an extent that the guide pin 76 is at the advance-side end portion of the first elongated hole 71a, thereby preventing any further advancement of the first plate 71. Moreover, the engagement pin 77 is moved within the second elongated hole 73a to its advance-side end portion.

As a result, the lock plate 72 is pivoted clockwise as viewed in the drawing by the return spring 75, bringing the first recessed portion 72b to a position above the second elongated hole 73a. The second plate 73 is free relative to the lock plate 72 because the engagement claw 72d is not in engagement with the engagement pin 77. In this state, the second plate 73 cannot receive any force from the lock plate 72. Thus, the state is such that the second plate 73 is freely pivotable relative to the first rotary shaft 74, and the left lid-locking cable 51 is slackened.

FIG. 17(b) is a state where the key-locked state is released. The first plate 71 is retreated by the return spring 78. Since the first recessed portion 72b is located above the second elongated hole 73a, the engagement pin 77 engages with the first recessed portion 72b and stops at a middle position in the second elongated hole 73a in the longitudinal direction. In this state, the key-locked state is simply released, and the lock plate 72 is yet to be pivoted. Thus, the state is such that the second plate 73 is free relative to the lock plate 72 but the lid locks 52 can be released by operating the left lid opening lever 42L.

FIG. 17(c) is a state where the left lid opening lever 42L is slightly pivoted counterclockwise against the return spring 75 after releasing the key-locked state. Because the first recessed portion 72b is moved off the second elongated hole 73a, the engagement pin 77 gets off the first recessed portion 72b and is moved within the second elongated hole 73a to its retreat-side end portion. Here, the second recessed portion 72c coincides with the retreat-side end portion of the second elongated hole 73a, and therefore the engagement pin 77 engages with the second recessed portion 72c.

Moreover, the engagement claw 72d engages with the engagement pin 77, thereby making the second plate 73 operable in conjunction with the lock plate 72.

FIG. 17(d) is a trunk-open state where the left lid opening lever 42L is further pivoted counterclockwise. In this state, the lock plate 72 is further pivoted counterclockwise, thereby causing the engagement claw 72d, which is in engagement with the engagement pin 77, to push the engagement pin 77. Thus, the second plate 73 is pivoted counterclockwise as viewed in the drawing about the first rotational shaft 74.

Here, the interlocking protrusion 73c is in contact with the outer end surface of the tip portion of the engagement claw 77d. Thus, the pivoting force of the lock plate 72 is transmitted to the second plate 73 through the interlocking protrusion 73c as well. Accordingly, the pivot of the second plate 73 is smooth.

The pivot of the second plate 73 pulls the left lid-locking cable 51 and thus releases the left lid locks 52, thereby making the lid 22 of the left side trunk 20 openable.

Next, advantageous effects of this embodiment will be described. The following will describe only the left side as an exemplary illustration and omit description of the right side in a case where the drawings to be referred to in the description show only the left side. However, the right side can achieve the same advantageous effects as the left side.

As shown in FIGS. 8, 12, and 13, the left lid opening lever 42L and the left lid opening mechanism 41L are vertically engaged so as to be operable in conjunction with each other by inserting the curved surface portion 62, provided on an upper end portion of the engagement protrusion 72a, into the engagement hole 61a in the engagement portion 61 with a gap therebetween. Thus, the engagement portion can be given a gap to absorb errors.

Accordingly, the left lid opening lever 42L can be attached accurately to the left grab rail 12L even if the positional errors in the attachment are large as a result of attaching the left lid opening lever 42L to the left grab rail 12L and attaching the left lid opening mechanism 41L to the upper pipe 9a, which is part of the vehicle body frame, through the stay 40. Thereby, the gap between the left lid opening lever 42L and the left grab rail 12L can be made as small as possible, and thus the unity therebetween can be achieved.

Meanwhile, since the stay 40 is detachably attached to the upper pipe 9a with the bolt 40a, the positional error of the left lid opening mechanism 41L may become larger when it is attached. However, this error can be absorbed as well.

Moreover, as shown in FIGS. 3 and 4, each grab rail 12 is attached to its seat rail 8 together with the seat 7 in such a way as to at least partly overlap the seat edge portion 11b from above in a plan view and contact the surface thereof. Thus, the grab rail 12 is attached based on the seat, which basically increases the positional error between the left lid opening lever 42L and the left lid opening mechanism 41L. Such a large error, however, can be absorbed effectively by engaging them by using the error absorbing gap.

In addition, as shown in FIGS. 12 and 13, there is provided the coil spring 63 which is engaged with the left grab rail 12L and the left lid opening lever 42L and biases the left lid opening lever 42L in such a way that the position thereof in a free state remains constant. Thus, the engagement portion 61 can be positioned to a predetermined initial position in the assembly. Accordingly, the assembly is made easier.

Further, the gap between the engagement portion 61 and the curved surface portion 62 has directional characteristics and is capable of reflecting the directional characteristics of the positional error which actually occurs in the assembly. Accordingly, a backlash in the assembly can be minimized.

Furthermore, as shown in FIGS. 3 and 4, each lid opening lever 42 is situated within a small stepped portion given on a far side of the wide rear center cover 17 as viewed from the lateral side of the vehicle. Accordingly, the possibility of accidentally operating of the lid opening lever 42 can be reduced.

In addition, the lid opening lever 42 is located under the extension portion 14 which is in an area partitioned from the grabbing portion 13 by the attachment portion 16. Accordingly, an accidental operation on the lid opening lever 42 is less likely.

Further, the lid opening lever 42 pivots outward in the vehicle width direction. Thus, the action of pivoting the lid opening lever 42 and the action of grabbing the grab rail 12 from outside are the opposite actions. Accordingly, an accidental operation on the lid opening lever 42 is less likely to occur.

Furthermore, a front end portion of the finger hook portion 60 (FIGS. 12 and 13) is long. Thus, it is easy to hook fingers on the finger hook portion 60 and operate it. Accordingly, the operatability is improved. In addition, as shown in FIG. 3, the lid opening lever 42 has its upper side along the upper surface of the grab rail 12 and its lower side along the surface of the rear center cover 17. Thus, the design is improved.

Moreover, as shown in FIGS. 1 and 2, each of the portions of the rear center cover 17 above the side trunks 20 and 21 has a front end situated rearward of the passenger steps 27 and forms the surface extending upwardly rearward from the front end in such a way as to approach the upper surface of the corresponding grab rail 12 as extending rearward. Thus, the side trunks 20 and 21 can expand wider vertically toward the rear. Accordingly, the side trunks 20 and 21 can increase their volumes without obstructing the passenger's legs.

As shown in FIGS. 5 and 11, the lids 22 and 23 are opened only upon a releasing operation with the specific key 29. This offers security and safety that prevents unintentional opening of the lids.

Moreover, inserting one key 29 into the key hole in one key cylinder 29a can release the key-locked state in multiple locations. Accordingly, the operability is improved.

Further, the key operation takes place at the rear of the vehicle body. Thus, one can perform the key operation regardless of whether he or she is standing on the left or right side of the vehicle. Accordingly, the same operability can be offered to all riders in the world regardless of the custom such as right-hand traffic and left-hand traffic.

Note that the invention of the present application is not limited to the foregoing embodiment, and various modifications and applications are possible within the concept of the invention. For example, the saddle-ride type vehicle is not limited to a motorcycle and may be a three-wheeled vehicle, a four-wheeled vehicle, or some other kind, as long as it includes the seat 7 having the passenger seat 11 as well as the grab rail 12, the left side trunk 20, etc. provided on both or one of the left and right sides.

Moreover, the engagement portion between the lid opening mechanism 41 and the lid opening lever 42 may be such that the engagement hole 61a is provided on the lid opening mechanism 41 side and that the engagement protrusion is provided on the lid opening lever 42 side. The curved surface portion 62 does not necessarily have to be provided.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A saddle-ride vehicle, comprising:
   a tandem seat including a rider seat and a passenger seat disposed behind said rider seat;
   a side trunk disposed on a lateral side of said passenger seat, said side trunk including
   a lid which opens and closes,
   a lid lock which locks said lid in a closed state,
   a lid opening mechanism which releases the closed state of said lid lock to open said lid, and
   a lid opening lever which actuates said lid opening mechanism;
   a rear-vehicle-body cover continuously covering said side trunk and a rear part of a vehicle body; and
   a grab rail, provided on the lateral side of said passenger seat,
   wherein said grab rail is attached to a vehicle body frame,
   wherein said lid opening lever is pivotally attached to a lower surface of said grab rail,
   wherein said lid opening mechanism is attached to a stay and is vertically engaged with said lid opening lever, said stay being detachably fastened to the vehicle body frame, and
   wherein a gap is formed between an engagement portion of said lid opening mechanism and said lid opening lever.

2. The saddle-ride vehicle according to claim 1,
   wherein a seat edge portion is disposed on both sides of a seating surface of said passenger seat, said seat edge portion extending obliquely downward while spreading outward and connecting to an upper surface of said rear-vehicle-body cover, and
   wherein said grab rail is attached to said vehicle body frame together with said tandem seat, such that said grab rail at least partly overlaps said seat edge portion from above in a plan view and contacts a surface of said seat edge portion.

3. The saddle-ride vehicle according to claim 1, further comprising an elastic member which is engaged with said grab rail and said lid opening lever, and biases said lid opening lever such that a position of said lid opening lever remains constant when said lid opening lever is in a free state.

4. The saddle-ride vehicle according to claim 2, further comprising an elastic member which is engaged with said grab rail and said lid opening lever, and biases said lid opening lever such that a position of said lid opening lever remains constant when said lid opening lever is in a free state.

5. The saddle-ride vehicle according to claim 1,
   wherein one of said lid opening mechanism and said lid opening lever includes an engagement protrusion projecting vertically and having a curved surface portion formed on a tip portion thereof,
   wherein one of said lid opening mechanism and said lid opening lever which does not include said engagement protrusion includes an engagement hole for said curved surface portion of said engagement protrusion to be engaged with,
   wherein said curved surface portion of said engagement protrusion is engaged with said engagement hole with a gap therebetween, and
   wherein said gap between said curved surface portion of said engagement protrusion and said engagement hole differs in size between spaces forward and rearward of said engagement portion, and differs in size between spaces left and right of said engagement portion.

6. The saddle-ride vehicle according to claim 2,
   wherein one of said lid opening mechanism and said lid opening lever includes an engagement protrusion projecting vertically and having a curved surface portion formed on a tip portion thereof,
   wherein one of said lid opening mechanism and said lid opening lever which does not include said engagement protrusion includes an engagement hole for said curved surface portion of said engagement protrusion to be engaged with,
   wherein said curved surface portion of said engagement protrusion is engaged with said engagement hole with a gap therebetween, and
   wherein said gap between said curved surface portion of said engagement protrusion and said engagement hole differs in size between spaces forward and rearward of said engagement portion, and differs in size between spaces left and right of said engagement portion.

7. The saddle-ride vehicle according to claim 3,
   wherein one of said lid opening mechanism and said lid opening lever includes an engagement protrusion projecting vertically and having a curved surface portion formed on a tip portion thereof,
   wherein one of said lid opening mechanism and said lid opening lever which does not include said engagement protrusion includes an engagement hole for said curved surface portion of said engagement protrusion to be engaged with,
   wherein said curved surface portion of said engagement protrusion is engaged with said engagement hole with a gap therebetween, and
   wherein said gap between said curved surface portion of said engagement protrusion and said engagement hole differs in size between spaces forward and rearward of said engagement portion, and differs in size between spaces left and right of said engagement portion.

8. The saddle-ride vehicle according to claim 4,
   wherein one of said lid opening mechanism and said lid opening lever includes an engagement protrusion projecting vertically and having a curved surface portion formed on a tip portion thereof,
   wherein one of said lid opening mechanism and said lid opening lever which does not include said engagement protrusion includes an engagement hole for said curved surface portion of said engagement protrusion to be engaged with,
   wherein said curved surface portion of said engagement protrusion is engaged with said engagement hole with a gap therebetween, and wherein said gap between said curved surface portion of said engagement protrusion and said engagement hole differs in size between spaces forward and rearward of said engagement portion, and differs in size between spaces left and right of said engagement portion.

9. The saddle-ride type vehicle according to claim 2,
wherein said rear-vehicle-body cover continuously covers said side trunk and said rear part of said vehicle body, and extends in a vehicle width direction from said seat edge portion,
wherein an upper surface of said grab rail is substantially at the same height as an upper surface of said tandem seat, and
wherein said lid opening lever is disposed within in a height direction and a width direction of said grab rail.

10. The saddle-ride vehicle according to claim 9,
wherein said grab rail includes a grabbing portion and an extension portion extending rearward from said grabbing portion,
wherein said grabbing portion extends upward and rearward from a front attachment portion where said grabbing portion is attached to said vehicle body frame,
wherein said extension portion extends downward and rearward from a rear portion of said grabbing portion,
wherein a portion of said rear-vehicle-body cover above said side trunk has a front end disposed rearward of a passenger step, and forms a surface extending upward and rearward from said front end of said side trunk, such that said surface of said rear-vehicle-body cover approaches said upper surface of said grab rail as said surface of said rear-vehicle-body cover extends rearward,
wherein in a side view, said lid opening lever is under said extension portion of said grab rail and above said surface of said rear-vehicle-body cover which extends upward and rearward,
wherein said lid opening lever has a finger hook portion on a front side and a pivot base portion on a rear side, said pivot base portion capable of having a pivot center shaft inserted therein, and
wherein a front end portion of said finger hook portion is higher than said pivot base portion.

11. The saddle-ride vehicle according to claim 1,
wherein said grab rail includes a grabbing portion and an extension portion extending rearward from said grabbing portion,
wherein said grabbing portion and said extension portion are partitioned by an attachment portion of said grab rail to said vehicle body,
wherein a vertical gap between said extension portion and said vehicle body is smaller than a vertical gap between said grabbing portion and said vehicle body,
wherein said lid opening lever is under said extension portion and above said rear-vehicle-body cover, and
wherein said lid opening lever operates outwardly, in the vehicle width direction, from a lateral side of said vehicle body, to open said lid.

12. The saddle-ride vehicle according to claim 1, further comprising:
a plurality of said lid opening levers and a plurality of said lid opening mechanisms,
wherein each of said lid opening mechanisms includes a lock mechanism capable of making a lid opening action of said lid opening mechanisms non-functional,
wherein said lock mechanism is released from a locked state by a key cylinder,
wherein said key cylinder is a single member, is attached with only a key hole shown on an exterior surface of said vehicle body, and permits only a specific key to pivot a key cylinder lever to perform an unlocking action,
wherein a transmission portion with a plurality of passages transmits the unlocking action of said key cylinder lever from said key cylinder to said plurality of lid opening mechanisms, and
wherein said plurality of lid opening mechanisms perform said lid opening action to open said lids in response to actuation of said lid opening levers, respectively, when said transmission portion transmits the unlocking action of said key cylinder lever to said plurality of lid opening mechanisms.

13. The saddle-ride vehicle according to claim 12,
wherein said side trunk is provided on both left and right sides of said saddle-ride vehicle,
wherein said lid opening lever and said lid opening mechanism are each provided in a number equal to a number of said side trunks, and are disposed under left and right grab rails, respectively,
wherein each of said lid opening mechanisms includes said lock mechanism and is released from the locked state by said key cylinder, and
wherein said key cylinder is disposed at a rear end of said saddle-ride vehicle.

\* \* \* \* \*